(12) United States Patent
Ohkuwa et al.

(10) Patent No.: US 8,148,924 B2
(45) Date of Patent: Apr. 3, 2012

(54) ELECTRICAL MOTOR LOAD CONTROLLER AND CONTROL METHODS THEREFOR

(75) Inventors: Yoshihiro Ohkuwa, Hoi-gun (JP); Shigeyuki Kido, Nishikamo-gun (JP); Naoki Matsushita, Nishikamo-gun (JP); Kenji Terao, Chiryu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 466 days.

(21) Appl. No.: 12/311,609

(22) PCT Filed: Oct. 10, 2007

(86) PCT No.: PCT/IB2007/003011
§ 371 (c)(1),
(2), (4) Date: Apr. 6, 2009

(87) PCT Pub. No.: WO2008/044123
PCT Pub. Date: Apr. 17, 2008

(65) Prior Publication Data
US 2010/0004793 A1      Jan. 7, 2010

(30) Foreign Application Priority Data

Oct. 11, 2006  (JP) ................................. 2006-277810
Jun. 4, 2007   (JP) ................................. 2007-148190

(51) Int. Cl.
*H02P 5/00*         (2006.01)

(52) U.S. Cl. ............ 318/34; 318/43; 318/103; 318/140; 307/10.1; 307/11

(58) Field of Classification Search ............... 318/103, 318/34, 43, 140; 307/39, 64, 10.1, 11, 35; 700/295, 296; 322/25
See application file for complete search history.

(56) References Cited

U.S. PATENT DOCUMENTS

| 4,310,770 | A | * | 1/1982 | Keener et al. | 307/35 |
| 4,324,987 | A | * | 4/1982 | Sullivan et al. | 307/35 |
| 4,348,668 | A | * | 9/1982 | Gurr et al. | 340/3.32 |
| 4,382,284 | A | * | 5/1983 | Dressel et al. | 700/295 |

(Continued)

FOREIGN PATENT DOCUMENTS

DE       198 42 043 A1     3/2000

(Continued)

OTHER PUBLICATIONS

German Office Action issued in Patent Application No. 11 2007 002 392.9-32, dated Oct. 5, 2010 (with translation).

*Primary Examiner* — Paul Ip
(74) *Attorney, Agent, or Firm* — Oliff & Berridge, PLC

(57) ABSTRACT

An electrical load controller that controls the starting sequence for a plurality of electrical loads includes a start demanding unit that generates a demand to start at least one of the plurality of electrical loads. A first electrical load is started immediately if the time between when a second electrical load start and when the second electrical load receives a signal indicating that the first electrical load will start (second prescribed time) is longer than the time required to send the signal between the first and second electrical loads (third prescribed time), and the time required for an inrush current to decrease to a prescribed value (first prescribed time) is less than the difference between the second prescribed time and the third prescribed time. Thus, there is sufficient time for the inrush current of the first electrical load to decrease before starting the second electrical load.

16 Claims, 13 Drawing Sheets

U.S. PATENT DOCUMENTS

| | | | | |
|---|---|---|---|---|
| 4,694,192 | A * | 9/1987 | Payne et al. | 307/39 |
| 5,481,140 | A * | 1/1996 | Maruyama et al. | 307/11 |
| 5,561,363 | A * | 10/1996 | Mashino et al. | 322/25 |
| 5,978,352 | A * | 11/1999 | Imaizumi et al. | 370/216 |
| 6,018,690 | A | 1/2000 | Saito et al. | |
| 6,411,236 | B1 * | 6/2002 | Kermani | 341/141 |
| 6,700,386 | B2 * | 3/2004 | Egami | 324/503 |
| 7,173,347 | B2 * | 2/2007 | Tani et al. | 307/10.1 |
| 7,948,117 | B2 * | 5/2011 | Lathrop et al. | 307/64 |
| 2002/0024332 | A1 | 2/2002 | Gardner | |
| 2002/0084786 | A1 * | 7/2002 | Egami | 324/503 |
| 2002/0113441 | A1 | 8/2002 | Obayashi | |
| 2004/0124703 | A1 * | 7/2004 | Tani et al. | 307/10.1 |
| 2005/0195546 | A1 * | 9/2005 | Itoshima et al. | 361/93.1 |
| 2008/0239949 | A1 * | 10/2008 | Nishizaki | 370/230 |
| 2009/0102425 | A1 * | 4/2009 | Takahashi | 320/136 |
| 2010/0004793 | A1 * | 1/2010 | Ohkuwa et al. | 700/295 |
| 2010/0152915 | A1 * | 6/2010 | Nakagawa | 700/296 |

FOREIGN PATENT DOCUMENTS

| | | |
|---|---|---|
| DE | 101 62 522 A1 | 7/2002 |
| DE | 102 32 539 A1 | 2/2004 |
| DE | 103 41 907 A1 | 4/2005 |
| EP | 0 884 819 A2 | 12/1998 |
| JP | A-2003-118511 | 4/2003 |
| JP | A-2004-194495 | 7/2004 |

* cited by examiner

F I G. 5

| No. | LABEL | RELATIONSHIP EQUATION (EXAMPLE) | EXAMPLE VALUE IN THE EMBODIMENT (UNITS: ms) |
|---|---|---|---|
| e20 | AI PROCESSING PERIOD | | 40 |
| e21 | AI OUTPUT PERIOD | | 40 |
| e22 | AI TRANSMISSION PERIOD | | 150 |
| TR3 | AI MAXIMUM WAITING TIME | | 750 |
| TR6 | AI RESOURCE USAGE TIME | | 300 |
| e25 | TIME UNTIL START OF AI RESOURCE USAGE | AI PROCESSING PERIOD + AI OUTPUT PERIOD (=e20+e21) | 80 |
| T5 | WAITING TIME BEFORE AI RESOURCE USAGE | | 600 |
| e02 | TIME CORRESPONDING TO TIME FROM START OF VSC RECEPTION UNTIL COMPLETION OF RESOURCE USAGE | VSC PROCESSING PERIOD + VSC OUTPUT PERIOD + RESOURCE USAGE PERIOD (=v24+v21+v20) | 80 |
| e03 | TIME CORRESPONDING TO TIME FROM START OF VSC OUTPUT UNTIL COMPLETION OF RESOURCE USAGE | VSC OUTPUT PERIOD + RESOURCE USAGE PERIOD (=v21+v20) | 65 |

FIG. 6

| No. | LABEL | RELATIONSHIP EQUATION (EXAMPLE) | EXAMPLE VALUE IN THE EMBODIMENT (UNITS: ms) |
|---|---|---|---|
| v20 | VSC PROCESSING PERIOD | | 15 |
| v21 | VSC OUTPUT PERIOD | | 15 |
| v22 | VSC TRANSMISSION PERIOD | | 60 |
| TR2 | VSC MAXIMUM WAITING TIME | | 750 |
| TR5 | VSC RESOURCE USAGE TIME | | 50 |
| v25 | TIME BEFORE AHC OPERATION THAT VSC CAN BE ENTERED | | 1020 |
| v27 | TIME BEFORE AI OPERATION THAT VSC CAN BE ENTERED | | 135 |
| v30 | TIME VSC WAITS FROM THE GENERATION OF THE DRIVE DEMAND AFTER THE AHC START NOTIFICATION SIGNAL GOES OFF | | 550 |
| v32 | TIME VSC WAITS FOR THE DRIVE DEMAND AFTER THE AHC START NOTIFICATION SIGNAL GOES OFF | | 525 |
| v33 | TIME UNTIL THE COMPLETION OF THE VSC RESOURCE USAGE OUTPUT | OUTPUT PERIOD + RESOURCE USAGE TIME (=v21+TR5) | 65 |
| v34 | TIME FROM VSC RECEPTION UNTIL COMPLETION OF RESOURCE USAGE | PROCESSING PERIOD + OUTPUT PERIOD + RESOURCE USAGE TIME (=v20+v21+TR5) | 80 |

FIG. 7

| No. | LABEL | RELATIONSHIP EQUATION (EXAMPLE) | EXAMPLE VALUE IN THE EMBODIMENT (UNITS: ms) |
|---|---|---|---|
| a20 | AHC PROCESSING PERIOD | | 25 |
| a21 | AHC OUTPUT PERIOD | | 100 |
| a22 | AHC TRANSMISSION PERIOD | | 60 |
| TR1 | AHC MAXIMUM WAITING TIME | | 5000 |
| TR4 | AHC RESOURCE USAGE TIME | | 50 |
| T1 | WAITING TIME BEFORE AHC RESOURCE USAGE | | 1250 |
| T4 | WAITING TIME UNTIL RESTART AFTER RESOURCE IS FREE AFTER AHC STOPPAGE | | 500 |
| a27 | TIME UNTIL COMPLETION OF AHC RESOURCE USAGE | AHC OUTPUT PERIOD + AHC RESOURCE USAGE TIME (=a21+TR4) | 150 |

FIG. 8

| No. | LABEL | RELATIONSHIP EQUATION (EXAMPLE) | EXAMPLE VALUE IN THE EMBODIMENT (UNITS: ms) |
|---|---|---|---|
| n01 | MAXIMUM COMMUNICATION LAG FROM VSC TO AHC | VSC TRANSMISSION PERIOD + VSC COMMUNICATION DELAY + AHC PROCESSING PERIOD | 145 |
| n02 | MAXIMUM COMMUNICATION LAG FROM VSC TO AI | VSC TRANSMISSION PERIOD + AHC COMMUNICATION DELAY + AI PROCESSING PERIOD + GATEWAY DELAY | 210 |
| n03 | MAXIMUM COMMUNICATION LAG FROM AI TO VSC | AI TRANSMISSION PERIOD + AI COMMUNICATION DELAY + VSC PROCESSING PERIOD + GATEWAY DELAY | 365 |
| n04 | MAXIMUM COMMUNICATION LAG FROM AI TO AHC | AI TRANSMISSION PERIOD + AI COMMUNICATION DELAY + AHC PROCESSING PERIOD + GATEWAY DELAY | 375 |
| n05 | MAXIMUM COMMUNICATION LAG FROM AHC TO VSC | AHC TRANSMISSION PERIOD + AHC COMMUNICATION DELAY + VSC PROCESSING PERIOD | 135 |
| n06 | MAXIMUM COMMUNICATION LAG FROM AHC TO AI | AHC TRANSMISSION PERIOD + AHC COMMUNICATION DELAY + AI PROCESSING PERIOD + GATEWAY DELAY | 210 |

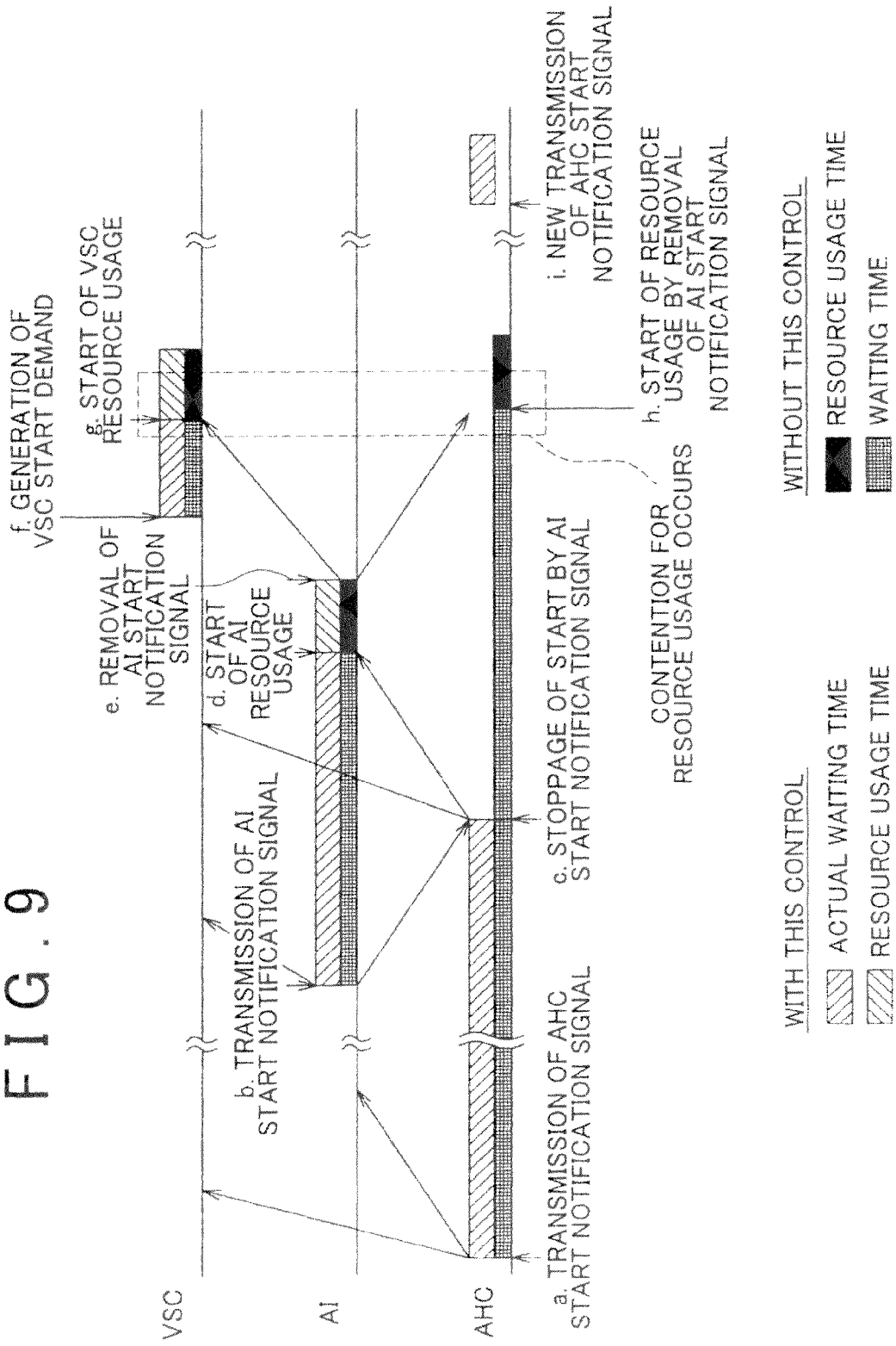

FIG. 13

ELECTRICAL MOTOR LOAD CONTROLLER AND CONTROL METHODS THEREFOR

BACKGROUND OF THE INVENTION

1. Field of the Invention

The present invention relates to an electrical load controller and an electrical motor load controller and methods for controlling the start of an electrical load and the start of an electrical motor load.

2. Description of the Related Art

A conventional load driving controller controls the distribution of power from a power supply to various electrical loads, based on a priority ranking assigned to each of the electrical loads (see, for example, Japanese Patent Application Publication No. 2004-194495 (JP-A-2004-194495)). The load driving controller has a power distribution controller that calculates the amount of power that the power supply can supply, and calculates the power that should be supplied to each of the electrical loads, based on the priority ranking.

In a system incorporating a plurality of electrical loads, the power supply may at times be insufficient to supply electrical power to all the loads because the current drawn by the overlapping of the starting of the electrical loads may exceed the capacity of the power supply.

Although stable power supply capacity with respect to a high-priority electrical load may be achieved by distributing electrical power to the electrical loads in accordance with the priority ranking thereof, it is necessary to have a management apparatus to perform centralized management of the electrical loads by, for example, calculating the power to be supplied to each electrical load. If such an apparatus is not provided, it is not possible to prevent a decrease in the supply capability of the power supply with respect to the electrical loads, when the starts of the electrical loads.

SUMMARY OF THE INVENTION

The present invention provides an electrical load controller and a method of controlling an electrical load that prevents overlapping of the starts of a plurality of electrical loads. The invention further provides an electrical motor load controller and a method of controlling an electrical motor load that prevents overlapping of the starts of a plurality of electrical motor loads.

According to a first aspect of the present invention, an electrical load controller for first and second electrical loads, includes a start demanding unit that generates a demand to start at least the first electrical load of the first and the second electrical loads. A first prescribed time period is a duration of time over which an inrush current, generated when the first electrical load is started, decreases to a prescribed value, a second prescribed time period is a duration of time between the time when a second electrical load notification signal, which indicates that the second electrical load will start, is sent to the first electrical load and the time when the second electrical load starts, and a third prescribed time period is a duration of time required to transmit the notification signal from the second electrical load to the first electrical load. The second prescribed time period is longer than the third prescribed time period, and the first prescribed time period is shorter than the second prescribed time period minus the third prescribed time period. In the first aspect of the invention, the first electrical load starts immediately if the first electrical load has not received the second electrical load notification signal when the start demanding unit generates the demand to start the first electrical load. In this manner, if the first electrical load starts immediately, for example, even if the first electrical load receives the second electrical load notification after the first electrical load starts, sufficient time elapses so that the inrush current of the first electrical load decreases before the second electrical load starts.

In this case, the "first electrical load starts immediately" means that the first electrical load may start substantially simultaneously with the demand to start the first electrical load by the start demanding unit. The "substantially simultaneously" includes the time for the first electrical load to recognize the start demand of the first electrical load by the start demanding unit.

A second aspect of the present invention is the electrical load controller according to the first aspect, the first electrical load may be started immediately if, when the start demanding unit generates the demand to start the first electrical load, an elapsed time after the first electrical load receives the second electrical load notification signal is shorter than the second prescribed time period minus the first prescribed time period and the third prescribed time period. In this manner, if the first electrical load starts immediately, for example, even if the first electrical load starts after the first electrical load receives the second electrical load notification signal, sufficient time elapses so that the inrush current, generated when the first electrical load is started, decreases before the second electrical load starts.

A third aspect of the present invention is the electrical load controller according to the first or second aspect of the invention, wherein the first electrical load may be started after the second electrical load starts if, when the start demanding unit generates the demand to start the first electrical load, an elapsed time after the first electrical load receives the second electrical load notification signal is longer than the second prescribed time period minus the first prescribed time period and the third prescribed time period. In this manner, if the first electrical load is started after the second electrical load starts, for example, it is possible to prevent overlapping the starting time of the second electrical load and a duration of time from the time when the first electrical load starts to the time when the inrush current of the first electrical load decreases.

A fourth aspect of the present invention is the electrical load controller according to the third aspect of the invention, a fourth prescribed time period is a duration of time over which an inrush current, generated when the second electrical load is started, decreases to a prescribed value, and the first electrical load may be started when the fourth prescribed time has elapsed after the second electrical load is started if, when the start demanding unit generates the demand to start the first electrical load, the elapsed time after the first electrical load receives the second electrical load notification signal is longer than the second prescribed time period minus the first prescribed time period and the third prescribed time period. In this manner, if the first electrical load starts after the fourth prescribed time period has elapsed from the start of the second electrical load, for example, sufficient time elapses so that the inrush current of the second electrical load decreases before the first electrical load starts.

A fifth aspect of the present invention is the electrical load controller according to the third or fourth aspect of the invention, wherein the first electrical load may be started after receiving a signal indicating that the start of the second electrical load is completed if, when the start demanding unit generates the demand to start the first electrical load, the elapsed time after the first electrical load receives the second electrical load notification signal is longer than the second prescribed time period minus the first prescribed time period and the third prescribed time period. In this manner, if the first electrical load starts after receiving the signal indicating that the start of the second electrical load is completed, for example, considering the communication lag, the second electrical load is prevented from starting before sufficient time has elapsed so that the inrush current of the first electrical load has decreased.

A sixth aspect of the present invention is the electrical load controller according to any one of the third to fifth aspects of the invention, wherein the first electrical load transmits a first electrical load notification signal to the second electrical load when the start demanding unit demands the start of the first electrical load, and the second electrical load starts without waiting for the second prescribed time period to elapse when the second electrical load receives the first electrical load notification signal if, when the start demanding unit demands the start of the first electrical load, the elapsed time after the first electrical load receives the second electrical load notification signal is longer than the second prescribed time period minus the first prescribed time period and the third prescribed time period. In this manner, if the second electrical load starts without waiting for the second prescribed time period to elapse after the second electrical loads receives the first electrical load notification signal, for example, the starting of the second electrical load is prohibited before sufficient time has elapsed so that the inrush current of the first electrical load decreases. In addition, because the second electrical load starts earlier than the usual starting, the waiting time until the first electrical motor load is able to start can be shortened.

A seventh aspect of the present invention is the electrical load controller according to any one of the first to sixth aspects of the invention, wherein the first electrical load is an vehicle stability control motor, and the second electrical load is an adjustable-height-suspension motor. The assignment of the first and second electrical loads in this manner enables the earlier starting of the vehicle stability control motor for stabilizing the behavior of a vehicle, which has a higher priority from the viewpoint of the vehicle safety, even if, for example, the demand to start the adjustable-height-suspension motor for stabilizing behavior of the vehicle occurs later than the demand to start the device for adjusting the vehicle height.

An eighth aspect of the present invention is the electrical load controller according to any one of the first to seventh inventions, wherein the second prescribed time period is equal to at least twice a transmission period of the second electrical load notification signal. In this manner, for example, even if the first electrical load fails to receive the second electrical load notification signal, the overlapping of starts may be prevented based on at least a second electrical load notification signal after the second time.

A ninth aspect of the present invention is a method for controlling the starts of a first electrical load and a second electrical load. In this aspect, a duration of time over which an inrush current, generated when the first electrical load is started, decreases to a prescribed value is a first prescribed time. The method according to the ninth aspect includes generating a demand to start the second electrical load, sending a second electrical load notification signal to the first electrical load when the demand to start the second electrical load is generated, starting the second electrical load when a second prescribed time has elapsed after the second electrical load notification signal is sent to the first electrical load. The method according to the ninth aspect further includes generating a demand to start the first electrical load, starting the first electrical load immediately after the demand to start the first electrical load is generated if the first electrical load has not received the second electrical load notification signal when the demand to start the first electrical load is generated. A third prescribed time period is required to transmit the second electrical load notification signal from the second electrical load to the first electrical load, the second prescribed time period is longer than the third prescribed time period, and the first prescribed time period is shorter than the second prescribed time period minus the third prescribed time period.

A tenth aspect of the present invention further includes an electrical motor load controller for a first electrical motor load, a second electrical motor load and a third electrical motor. A priority ranking of the second electrical motor load is lower than that of the first electrical motor load and the priority ranking of the third electrical motor load is lower than that of the second electrical motor load. In the tenth aspect, the second electrical motor load sends a second electrical motor load notification signal to the first and third electrical motor loads and starts when a first prescribed second electrical motor load delay time has elapsed after the second electrical motor load notification signal is sent to the first and third electrical motor; and the third electrical motor load sends a third electrical motor load notification signal to the first and second electrical motor loads and starts when a prescribed third electrical motor load delay time has elapsed after the third electrical motor load notification signal is sent to the first and second electrical motor. The starting of the third electrical motor load is stopped if the third electrical motor load receives the second electrical motor load notification signal after the third electrical motor load notification signal is sent. Even if, for example, the first electrical motor load starts when the first electrical motor load receives the second electrical motor load notification signal, the interruption of the start of the third electrical motor load itself prevents overlapping of the starting of the first and third electrical motor load.

A eleventh aspect of the present invention is an electrical motor load controller according to tenth aspect of the invention, the third electrical motor load may send a third electrical motor load completion signal to the first and second electrical motor loads when the starting of the third electrical motor load is stopped, and the second electrical motor load may start when a second prescribed second electrical motor load delay time has elapsed after the third electrical motor load completion signal is received. In this manner, for example, even if the first electrical motor load starts after the first electrical motor load receives the third electrical motor load completion signal, because the second electrical motor load starts when the second electrical motor load delay time has elapsed after the second electrical motor load receives the third electrical motor load completion signal, the starting of the first and second electrical motor load are prevented from overlapping.

An twelfth aspect of the present invention further includes an electrical motor load controller for a first electrical motor load and a second electrical motor load that has a lower priority ranking than the first electrical motor load. In this aspect, the first electrical motor load sends a first electrical motor load notification signal to the second electrical motor load and starts when a prescribed first electrical motor load delay time has elapsed after the first electrical motor load notification signal is sent to the second electrical motor load, and the second electrical motor load sends a second electrical motor load notification signal to the first electrical motor load and starts when a prescribed second electrical motor load delay time has elapsed after the second electrical motor load notification signal is sent to the first electrical motor load. The second electrical motor load starts without waiting for the elapse of the second electrical motor load delay time, if the second electrical motor load receives the first electrical motor load notification signal after the second electrical motor load notification signal is sent. According to this aspect, for example, when the second electrical motor load receives the first electrical motor load notification signal, the first electrical motor load determines that the first electrical motor load has not yet started at the point of the receiving, and thus starts during the first electrical motor load delay time, thereby preventing the start of the first and second electrical motor load from overlapping, and also causing the second electrical motor load to start earlier than usual.

A thirteenth aspect of the present invention is an electrical motor load controller which has a first electrical motor load; a second electrical motor load that has a lower priority ranking than the first electrical motor load; and a third electrical motor load that has a lower priority ranking than the second electrical motor load. A priority ranking of the second electrical motor load is lower than that of the first electrical motor load and the priority ranking of the third electrical motor load is lower than that of the second electrical motor load. In the thirteenth aspect, the third electrical motor load sends a third electrical motor load notification signal to the first and second electrical motor loads when the demand to start the third electrical motor load is generated and starts when a prescribed first delay time has elapsed after the third electrical motor load notification signal is sent to the first and second electrical motor loads, and the third electrical motor load stops sending the third electrical motor load notification signal and is stopped from starting if the third electrical motor load receives a first electrical motor load notification signal from the first electrical motor load or receives a second electrical motor load notification signal from the second electrical motor load, the second electrical motor load sends a second electrical motor load notification signal to the first and third electrical motor loads when a demand to start the second electrical motor load is generated, and starts when a prescribed second delay time has elapsed after the second electrical motor load notification signal is sent to the first and third electrical motor loads, and the second electrical motor load starts, without waiting for the elapse of the prescribed second delay time, if the second electrical motor load receives the first electrical motor load notification signal after sending the second electrical motor load notification signal if the second electrical motor load does not receive the third electrical motor load notification, and the first electrical motor load starts when a demand to start the first electrical motor load is generated if the first electrical motor load does not receive the second and the third electrical motor load notification signals, and if the demand to start the first electrical motor load is generated within a prescribed third delay time after the first electrical motor load stops receiving the third electrical motor load notification, the first electrical motor load sends the first electrical motor load notification signal to the second and third electrical loads and starts when a prescribed fourth delay time has elapsed after the first electrical motor load notification signal is sent to the second and third electrical loads. Because of the difference in communication delays between the ECUs, if a comparison is made at the same time, for example; the first electrical motor load may see the third electrical motor load as having stopped starting, while the second electrical motor load may see the third electrical motor load as not yet having stopped starting. The first electrical motor load sends the first electrical motor load notification signal within the prescribed third delay time after the first electrical motor load stops receiving the third electrical motor load notification signal. By doing this, the second electrical motor load starts without waiting the second waiting time period to elapse, and the first electrical motor load also starts when the prescribed fourth delay time period has elapsed after the first electrical motor load notification signal is sent. Therefore, the starts of the first and second electrical motor loads are prevented from overlapping after the start of the third electrical motor load is stopped.

A fourteenth aspect of the present invention is a method for controlling a start of a first electrical motor load, a second electrical motor load, which has a lower priority ranking than the first electrical motor load, and a third electrical motor load, which has a lower priority ranking than the second electrical motor load. This aspect includes generating a demand to start the second electrical motor load, sending a second electrical motor load notification signal to the first and third electrical motor loads when the demand to start the second electrical motor load is generated, starting the second electrical motor load when a prescribed second electrical motor load delay time has elapsed after the second electrical motor load notification signal is sent to the first and third electrical motor loads, generating a demand to start of the third electrical motor load, sending a third electrical motor load notification signal to the first and second electrical motor loads when the demand to start the third electrical motor load is generated, starting the third electrical motor load when a prescribed third electrical motor load delay time has elapsed after the third electrical motor load notification signal is sent to the first and second electrical motor loads, and stopping the third electrical motor load from starting if the third electrical motor load receives the second electrical motor load notification signal after the third electrical motor load notification signal is sent.

A fifteenth aspect of the present invention is a method for controlling a start of a first electrical motor load and a second electrical motor load, which has a lower priority ranking than the first electrical motor load. This aspect includes generating a demand to start the first electrical motor load, sending a first electrical motor load notification signal to the second electrical motor load when the demand to start the first electrical motor load is generated, starting the first electrical motor load when a prescribed first electrical motor load delay time has elapsed after the first electrical motor load notification signal is sent to the second electrical motor load, generating a demand to start the first electrical motor, sending a second electrical motor load notification signal to the first electrical motor load when the demand to start the second electrical motor load is generated, starting the second electrical motor load when a prescribed second electrical motor load delay time has elapsed after the second electrical motor load notification is sent to the first electrical motor load, starting the second electrical motor load without waiting for the elapse of the prescribed second electrical motor load delay time if the second electrical motor load receives the first electrical motor load notification signal after the second electrical motor load notification signal is sent.

A sixteenth aspect of the present invention is a method for controlling a start of a first electrical motor load, a second electrical motor load, which has a lower priority ranking than the first electrical motor load, and a third electrical motor load, which has a lower priority ranking than the second electrical motor load. This aspect includes generating a demand to start the third electrical motor load, sending a third electrical motor load notification signal to the first and second electrical motor loads when the demand to start the third electrical motor load is generated, starting the third electrical motor load when a prescribed first delay time has elapsed after the third electrical motor load notification signal is sent to the first and second electrical loads, stopping the transmission of the third electrical motor load notification signal and also stopping the third electrical motor load from starting when the third electrical motor load receives a first electrical motor load notification signal from the first electrical motor load or a second electrical motor load notification signal from the second electrical motor load, sending a second electrical motor load notification signal to the first and third electrical motor loads when the demand to start the second electrical motor load is generated, starting the second electrical motor load when a second delay time has elapsed after the second electrical motor load notification signal is sent to the first and third electrical loads, starting the second electrical motor load without waiting for the elapse of the second delay time if the second electrical motor load receives the first electrical load notification signal after sending the second electrical motor load signal when the second electrical motor load stops receiving the third electrical motor load notification signal, starting the first electrical motor load when a demand to start the first electrical motor load is generated when the first electrical motor load does not receive the second and third electrical motor load notification signals, sending the first electrical motor load notification signal to the second and third electrical loads if a demand to start the first electrical motor load is generated within a prescribed third delay time after the first electrical motor load stops receiving the third electrical motor load notification signal, and starting the first electrical motor load when a prescribed fourth delay time has elapsed after the first electrical motor load notification signal is sent to the second and third electrical loads.

BRIEF DESCRIPTION OF THE DRAWINGS

The above and other features and advantages of the present invention will become apparent from the following description of specified embodiment, given in conjunction with the accompanying drawings, in which:

FIG. 5 is a table showing the control constants related to the AI-ECU;

FIG. 6 is a table showing the control constants related to the VSC-ECU;

FIG. 7 is a table showing the control constants related to the AHC-ECU;

FIG. 8 is a table showing the communication delays between the ECUs;

FIG. 9 is a drawing describing the operating rule for the AHC motor;

FIG. 13 is a drawing showing contention and a method for avoiding contention for resources between the VSC motor and the AI motor.

DETAILED DESCRIPTION OF THE EMBODIMENTS

Figure 1:
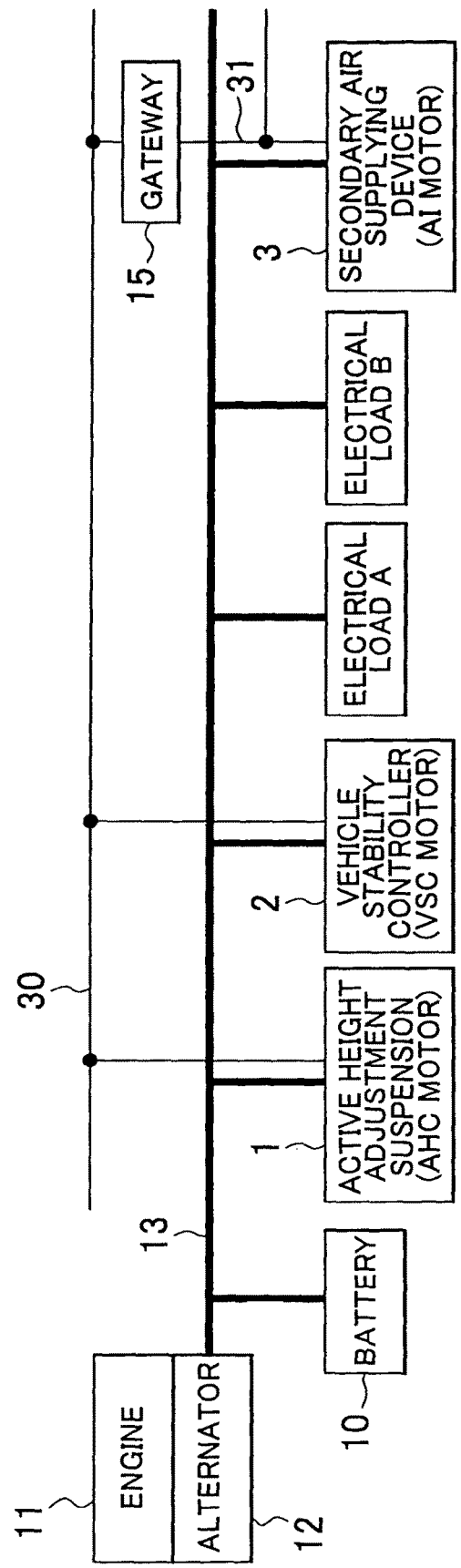
FIG. 1 is a drawing showing the configuration of an embodiment of an electrical load controller according to the present invention.

An example embodiment of the present invention is described below, with reference to accompanying drawings. FIG. 1 shows the configuration of an embodiment of an electrical load controller according to the present invention. The electrical load controller according to this embodiment controls electrical loads for a vehicle. The vehicle in this embodiment has mounted aboard it a plurality of electrical loads, such as an active height control suspension 1, a vehicle stability controller 2, and a secondary oxygen supplying apparatus 3.

The active height control (AHC) suspension 1 controls the height of the vehicle in response to an instruction from a user or the condition of the vehicle in order to improve the running performance and ease of ingress and egress, for example, by maintaining a constant vehicle height, or controlling the height appropriately in accordance with the vehicle speed. The active height control suspension 1 has an active height control motor (AHC motor) and an active height control computer (AHC-ECU). The AHC motor is a motor that drives a pump that adjusts the hydraulic pressure for controlling the vehicle height. For example, when a vehicle height adjustment demand signal, including an operation signal from the active height control operating device, such as a vehicle height switch operable by a user or an instruction signal from another computer is received, the AHC-ECU sets a start demand generation flag for the AHC motor to outputs a drive signal to drive the AHC motor. If a determination is made, based on sensor signals from a vehicle speed sensor or vehicle height sensor, that it is necessary to start the AHC motor, the AHC-ECU sets the start demand generation flag for the AHC motor and outputs a drive signal to drive the AHC motor. The AHC motor is operated in accordance with the drive signal, and the operation of the AHC motor is used to adjust the vehicle height.

The vehicle stability controller (VSC) 2 automatically adjusts the left and right braking forces and the output of the engine in response to conditions of the vehicle, such as the lateral acceleration, the yaw rate, and the steering angle, in order to improve the stability of the behavior of the vehicle. The vehicle stability controller 2 has a braking force adjustment motor (VSC motor) and a braking force adjustment computer (VSC-ECU). The VSC motor drives a pump that adjusts the hydraulic pressure to adjust the braking force (that is, a pump that establishes a hydraulic pressure source for applying braking force and a hydraulic pressure source for high pressure). The VSC-ECU controls the pressure for braking force and the hydraulic pressure source. The VSC-ECU, for example, based on sensor signals such as those from a vehicle speed sensor, an acceleration sensor, a yaw rate sensor, and a steering angle sensor, adjusts the braking force using the pressure from the hydraulic pressure source to stabilize the behavior of the vehicle. If the pressure of the hydraulic pressure source decreases as a result of adjusting the braking force, and it is determined that starting the VSC motor is necessary, the VSC motor start demand request generation flag is set and a drive signal that drives the VSC motor is output. The VSC motor is operated by the drive signal.

The secondary air supplying device (air injector (AI)) 3, by sending air from an air cleaner, for example, into an exhaust port (exhaust pipe), causes activation of the catalyst and promotes an improvement in total combustion of the exhaust gas. The secondary air supplying device 3 has a pump motor (AI motor) that sends air from the air cleaner, for example, into the exhaust port, and a computer (AI-ECU, which may be included in the engine ECU that controls the AI motor. If the AI-ECU determines, for example by a sensor signal from an exhaust sensor or by engine rotational speed information, that it is necessary to start the AI motor, the AI-ECU sets an AI motor start demand generation flag and outputs a drive signal that drives the AI motor. The AI motor is operated in accordance with the drive signal. By being able to adjust the amount of air sent to the exhaust port by the operation of the AI motor, it is possible to promote the activation of the catalyst, thereby promoting, for example, complete combustion of the exhaust gas.

In this manner, the foregoing ECUs, such as the AHC-ECU, function as start demanding unit, and when an ECU determines that it is necessary to start an electrical load that is driven by the ECU, the ECU determines that a demand to start the electrical load is generated. The appropriate ECU then sets a start demand generation flag to indicate the start demand generated condition, and outputs a drive signal that demands a start of that electrical load.

The AHC-ECU, VSC-ECU, and AI-ECU are formed by a plurality of circuit elements, such as a ROM that stores a control program and control data, a RAM that temporarily stores a control program and control data, a CPU that processes a control program, and an input/output interface for exchange of information with the outside.

The AHC-ECU of the active height control suspension 1, the VSC-ECU of the vehicle stability controller 2, and the AI-ECU of the secondary air supplying device 3 are connected so as to enable mutual communication via communication lines 30, 31. Each ECU is connected via the communication lines 30, 31, by, for example, via a bus-type, mesh-type, or star interconnection via a hub. Alternatively, the communications between the ECUs may be performed by broadcasting. The communication lines 30, 31 may be, for example, a CAN (Controller Area Network) bus. Communication between the ECUs may be performed as serial communication via a CAN or the like. Each ECU may be connected via a gateway, and in the case of FIG. 1, the communication line 30, by which the AHC-ECU and the VSC-ECU are connected, is connected to the communication line 31, to which the AI-ECU is connected, by a gateway 15. The gateway 15 is inserted when the communication protocols of the communication line 30 and communication line 31 differ.

The vehicle in this embodiment, in addition to the above-described active height control suspension 1, has mounted aboard it the electrical loads A, B. The electrical loads A and B are, for example, a navigation system, an engine controller, a brake controller, an air conditioner, a headlamp, a rear defogger, a rear wiper, a mirror heater, a seat heater, audio equipment, a lamp, a cigar socket, various ECUs (electronic control units), and a solenoid valve and the like.

It is possible to use a battery 10 or an alternator 12 as the power supply (resource) for an electrical load such as the active height control suspension 1. The battery 10 or the alternator 12 supplies electrical power to the electrical loads via a power supply line (harness) 13. Specific examples of the battery 10 include electrical storage devices, such as a lead battery, a lithium ion battery, a nickel-hydrogen battery, or a two-layer electrical capacitor.

The alternator 12, which generates electricity by converting kinetic energy to electrical energy, may be connected to the battery 10 via the power supply line 13. The alternator 12 generates electricity by the output of an engine 11 used for running the vehicle. The electrical power generated by the alternator 12 is supplied to the electrical load, such as the active height control suspension 1, or stored in the battery 10. When the alternator 12 is stopped, electrical power is supplied to the electrical loads from the battery 10. For example, the electrical power required in the parked condition when the engine 11 is stopped and the alternator 12 is not operating can be supplied from the battery 10.

As the number and current consumption of electrical loads receiving electrical power from the battery 10 or the alternator 12 via the power supply line 13 increase, the voltage of the battery 10 tends to decrease. For example, if a start demand for the AHC motor of the active height control suspension 1 and a start demand for the VSC motor of the vehicle stability controller 2 occur substantially simultaneously, because the operating currents of these motors (in particular the inrush current, which is generally larger than the steady-state operating current) are larger than, for example, electrical loads such as audio equipment, a large amount of electrical power is consumed by the operation of the AHC motor and the VSC motor, possibly resulting in the supply capability of the battery 10 or alternator 12 being temporarily exceeded. As a result, the voltage of the battery 10 decreases, and the electrical loads connected to the battery 10 (in particular, electrical loads such as a navigation system, which has a minimum operating voltage that is relatively higher than that of other electrical loads), including the active height control suspension 1 and the vehicle stability controller 2, which are the cause of the voltage decrease, might fail to function (for example, the computer resetting and motor outputs dropping) because of the decreased voltage. Also, for example, a lamp electrical load connected to the battery 10 might flicker. It is therefore necessary to provide a countermeasure to prevent the drop of the power supply voltage by the substantially simultaneous usage of the power supply (resource) in this manner.

Figure 2:
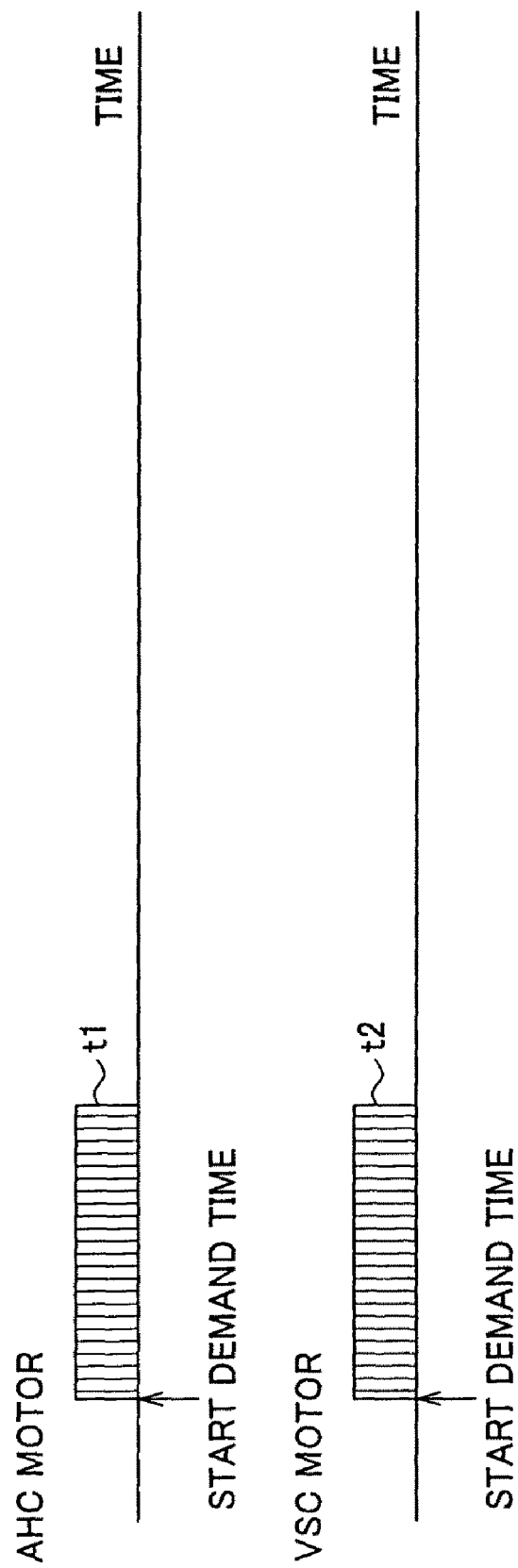
FIG. 2 is a drawing showing the relationship between the operational timing of the AHC motor of the active height control suspension 1 and the VSC motor of the vehicle stability controller 2.

FIG. 2 shows the relationship between the operational timing of the AHC motor of the active height control suspension 1 and the VSC motor of the vehicle stability controller 2. The time period t1 indicates the period of time (resource usage time) from the start of the AHC motor until the occurrence of a voltage drop in the battery 10 exceeding a prescribed value due to the operating current, and the time period t2 indicates the period of time (resource usage time) from the start of the VSC motor until the occurrence of a voltage drop in the battery 10 exceeding a prescribed value due to the operating current. If the start demands for the AHC motor and the VSC motor occur substantially simultaneously and each starts independently in accordance with the respective start demands, the time periods t1 and t2 may overlap in the same time period. As a result, the supply capability of the battery 10 or the alternator 12 is temporarily exceeded, and the voltage of the battery 10 significantly decreases, leading to the risk of a problem in the operation of the electrical loads that can receive electrical power from the battery 10 or the alternator 12. The influence is particularly great if the periods of time of the inrush currents of electrical loads such as motors, which occur immediately after the start, overlap. The same type of relationship also with respect to the operational timing of the AI motor of the secondary air supplying device 3.

Given the above, the electrical load controller of this embodiment executes controls, under prescribed restrictive conditions and in accordance with a prescribed operating rule, so that the AHC motor of the active height control suspension 1, the VSC motor of the vehicle stability controller 2, and the AI motor of the secondary air supply device 3 do not start simultaneously, thereby suppressing a decrease in the power supply voltage on the power supply line 13.

With regard to the starting priority ranking, as described above, because each of the motors of the active height control suspension 1, vehicle stability controller 2, and the secondary air supplying device 3 have hydraulic pumps that operate by the respective motors, large inrush currents occur. For this reason, to avoid the need to provide a large-capacity power supply that can tolerate the simultaneous starting of two or three of these devices, a priority ranking regarding starting (operation) is assigned to each device, and the start timing of each of the devices is set in accordance with the priority ranking. In this embodiment, giving consideration to the safety and emission performance of the vehicle, the priority ranking is the sequence of the vehicle stability controller 2, the secondary air supplying device 3, and the active height control suspension 1.

The restrictive conditions that must be satisfied are: (1) the AHC motor starts within a time period TR1 after the generation of a start demand therefor; (2) the VSC motor starts within a time period TR2 after the generation of a start demand therefor; (3) the AI motor starts within a time period TR3 after the generation of a start demand therefor; (4) the VSC motor and the AI motor do not start within a time period TR4 after the beginning of the start of the AHC motor; (5) the AHC motor and the AI motor do not start within a time period TR5 after the beginning of the start o the VSC motor; and (6) The AHC motor and the VSC motor do not start within a time period TR6 after the beginning of the start of the AI motor. In terms of specific constants, TR1 corresponds to the AHC motor maximum waiting time (for example, 5000 ms), TR2 corresponds to the VSC motor maximum waiting time (for example, 750 ms), TR3 corresponds to the AI motor maximum waiting time (for example, 750 ms), TR4 corresponds to the AHC motor resource usage time (for example, 50 ms), TR5 corresponds to the VSC motor resource usage time (for example, 50 ms), and TR6 corresponds to the AI motor resource usage time (for example, 300 ms). The restrictive conditions (1), (2), and (3) indicate conditions that allow a delay in the starting of the AHC motor, the VSC motor, and the AI motor, and the restrictive conditions (4), (5), and (6) indicate conditions that prohibit the start of the AHC motor, the VSC motor, and the AI motor. The restrictive conditions are determined in response to the required specifications for the vehicle, the ECUs, and the individual electrical loads.

The operating periods of the various ECUs will now be described. Each ECU executes control processing to determine whether starting of the electrical load controlled by the ECU is necessary, for example, a processing routine for a pump starting relay for the motor, this processing being performed each prescribed processing period. In accordance with a prescribed output period, each ECU also outputs a drive signal that demands the start of the electrical load controlled by the ECU. Additionally, each ECU outputs a signal, such as a start notification signal, to the communication line 30 in accordance with a prescribed transmission period, which gives notification to the other ECUs of the start of the electrical load controlled by the ECU. The constants indicating the processing period, the output period, and the transmission period for each of the ECUs are the values shown in FIG. 5, FIG. 6, and FIG. 7. These periods are determined in response to the required specifications for the vehicle, the ECUs, and the individual electrical loads. The values of FIG. 5, FIG. 6, and FIG. 7 will be referred to as appropriate hereinafter.

The communication lag between the ECUs is as follows. The ECUs are connected to and mutually communicate via the communication line 30. However, because of the existence of the gateway, and communication delays caused by network congestion, a communication lag occurs, attributed to the transmission periods and timing of the processing periods of each ECU. The maximum communication lag between each ECU can be calculated in accordance with the relationship equations shown in FIG. 8. The values of FIG. 8 will be referred to as appropriate hereinafter.

The operating rules of the AHC motor will now be described. Even if a demand to start has occurred, the AHC motor can be made to wait longer and start later than the VSC motor AI motor because of the restrictive conditions (1), (2), and (3). Taking note of this, in the case of providing all three motors, the AHC motor, the VSC motor, and the AI motor, it is possible to focus on the relationship between the AI motor and the VSC motor, which have shorter maximum waiting times than the AHC motor.

Given the above, the operating rules for the AHC motor are established as: ($\alpha$) when the AHC-ECU generates a start demand for the AHC motor, the AHC-ECU sends a notification of the start of the AHC motor to the VSC-ECU that control the VSC motor and to the AI-ECU that controls the AI motor, waits for the time period T1, and then starts the AHC motor; ($\beta$) if the AHC-ECU receives a start notification signal indicating the start of the VSC motor or the AHC motor before starting the AHC motor, the AHC-ECU removes the start demand generation flag for the AHC motor, and waits; ($\gamma$) if a start notification signal indicating the start of the VSC motor or the AI motor is canceled when the AHC-ECU is waiting, the AHC-ECU waits for the time period T4 and applies the rule ($\alpha$) again.

In terms of the specific constants within each of the operating rules of the AHC motor, T1 corresponds to the AHC waiting time before the AHC motor resource usage (for example, 1250 ms), and T4 corresponds to the waiting time from the time the resource is open after stopping the AHC motor until the restart (for example, 500 ms) (refer to FIG. 7).

The AHC motor rules will be described in detail, with reference to FIG. 9. FIG. 9 shows the operational relationship of the various motors on one and the same time axis. When an AHC motor start demand is generated, the AHC-ECU transmits a start notification signal (AHC motor start notification signal) that notifies the VSC-ECU and the AI-ECU of the start of the AHC motor (a.), and begins the waiting for the start of the AHC motor until the elapse of the time period T1 (AHC motor start preparation condition). If an AI motor start demand occurs, the AI-ECU transmits a start notification signal (AI motor start notification signal) that notifies the VSC-ECU and the AHC-ECU of the start of the AI motor (b.), and the AI-ECU waits for the start of the AI motor until the elapse of the time period T5 (details of T5 described below) (AI motor start preparation condition). If the AHC-ECU receives the AI motor start notification signal before the AHC motor starts, the AHC-ECU removes the start demand generation flag and does not start the AHC motor, thereby cancelling the AHC motor start preparation condition. By the AI-ECU starting the AI motor after the elapse of the time period T5, usage of the resource by the AI motor is started (d.). After the AI motor is started, the AI-ECU removes the AI motor start notification signal that is transmitted to the VSC-ECU and the AHC-ECU (e.).

Assume in this case that a VSC motor start demand has been generated. When this occurs, if the AHC-ECU continues to delay the start of the AHC motor without removing the start demand generation flag for the AHC motor, the AHC-ECU starts the AHC motor based on receiving the removal of the AI motor start notification signal (h.), and in the same manner as the AHC-ECU, the VSC-ECU, which had been waiting for the completion of the starting of the AI motor, starts the VSC motor based on the receiving of removal of the AI motor start notification signal (g.), leading to the risk of contention for resource usage.

Even if the VSC-ECU had been transmitting a start notification signal (VSC motor start notification signal) notifying the AI-ECU and the AHC-ECU of the start of the VSC motor (f.), it can be envisioned that, because of the communication delay, the AHC-ECU starts the AHC motor before the VSC motor start notification signal is received by the AHC-ECU (h.).

According to the foregoing operating rule of the AHC motor, therefore, by removing the AHC motor start demand generation flag to stop the start of AHC motor, such resource contention can be prevented. If the AHC-ECU receives the removal signal of the AI motor start notification signal after the start of the AHC motor is stopped, when the time period T4 elapses after the receipt of the removal signal of the AI motor start notification signal, the AHC-ECU may apply the operating rule ($\alpha$) and transmit the AHC start notification signal (i).

The start notification signal, such as the AI start notification signal, and the removal thereof may be represented by a 1-bit signal. That is, an ECU may notify the other ECUs of the start of the electrical load it controls by the generation of a start demand, setting the 1-bit notification signal to on (1) when the start is demanded, and, setting the 1-bit notification signal to off (0) when notifying the other ECUs of the completion (ending) of the starting or that there is no start demand, thereby indicating beforehand the start notification signal and the removal thereof. By using a 1-bit signal, it is possible to reduce the communication load.

The operating rules of the AI motor will now be described. Even if a start request occurs because of the restrictive conditions (1) and (3), the amount of time the AI motor can wait is shorter than the AHC motor. Because the AI-ECU has a transmission period e22 via the communication line 30 that is longer than the transmission periods v22 and a22 of the other ECUs, and because the AI-ECU may be connected to the communication line 30 via the gateway, the AI-ECU has a long communication delay relative to the other ECUs. Additionally, because the resource usage time TR6 of the AI motor (and particularly the amount of time for the inrush current occurring at the time of startup to halve) is longer than the resource usage times TR4 and TR5 of the AHC motor and the VSC motor, in order to cause a wait for the start of the AHC motor, which can wait a relatively long time, the AI-ECU outputs a start notification signal that indicates the start of the AI motor beforehand.

However, it is possible that the output of a drive signal that demands the start of the AHC motor may be completed before the AHC-ECU receives the foregoing start notification signal. In this case, if the maximum communication lag from the AI-ECU to the AHC-ECU is n04, the processing period of the AHC-ECU is a20, and the time for completion of resource usage by the AHC motor is a27 (calculable by the relationship equations shown in FIG. 7), the time by which the resource usage of the AHC motor will reliably end is n04+a20+a27=375+25+150=550 ms. Therefore, if the AI motor is started after waiting the time T5, which is longer than 550 ms, the resource usage times of the AHC motor and the AI motor will not overlap.

Given the above, the operating rule of the AI motor is established as (I) when an AI motor start demand occurs, the AI-ECU sends a start notification signal (AI motor start notification signal) to notify to the VSC-ECU and the AHC-ECU of the start of the AI motor, and waits for the time T5 to elapse before starting the AI motor.

The time T5 in the AI motor operating rule is longer than the time by which the resource usage of the AHC motor reliably ends, that is, time t5 corresponds to the waiting time before resource usage by the AI motor (for example, 600 ms).

The operating rules of the VSC motor will now be described. The operating rules of the VSC motor are: (A) the AHC-ECU sends a start notification signal to the VSC-ECU when a demand to start the AHC motor, the AI-ECU sends a start a start notification signal to the VSC-ECU when a demand to start the VSC motor, and the VSC-ECU starts the VSC motor without notification, if the VSC-ECU does not receive the start notification signal from the AHC-ECU and the start notification signal from the AI motor; (B) the VSC-ECU starts the VSC motor if the VSC-ECU motor receives the start notification signal from the AHC motor or the AI motor and the starting of the VSC motor can be completed before the start of the AHC motor or the AI motor; and (C) if the VSC-ECU receives the start notification signal from the AHC-ECU or the AI-ECU and it is not possible to complete the starting of the VSC motor before the start of the AHC motor or the AI motor, the VSC-ECU waits until the starting of the AHC motor or the AI motor is completed and starts the VSC motor after the starting of the AHC motor or the AI motor has been completed.

Control of the starting of the AHC motor and the VSC motor will now be described. Although the start of the AHC motor is delayed when the AHC-ECU sends a start notification signal, because the time period of delay for starting the AHC motor is longer than the VSC motor, and also the resource usage times of both the VSC motor and the AHC motor (and particularly the amount of time for the inrush current generated at the time of startup to halve) are short, even if the VSC-ECU does not send a VSC motor start notification signal to the AHC-ECU and delay a starting the AHC motor, it is possible to start both motors as long as the restrictive conditions are satisfied in the time period before and after. For this reason, as an initial rule in the above-described operating rules for the VSC motor, the VSC-ECU does not send the VSC motor start notification signal.

Figure 3:
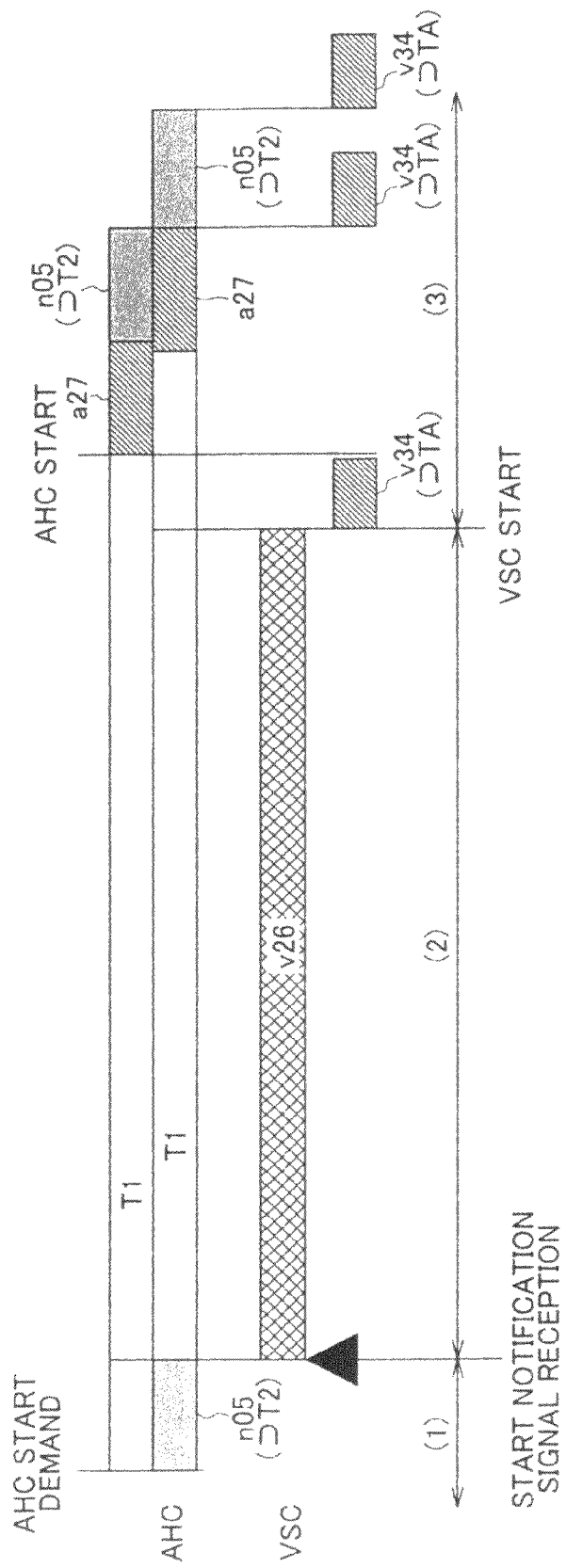
FIG. 3 is a drawing showing the relationship between the start timing of the AHC motor and the VSC motor.
Figure 4:
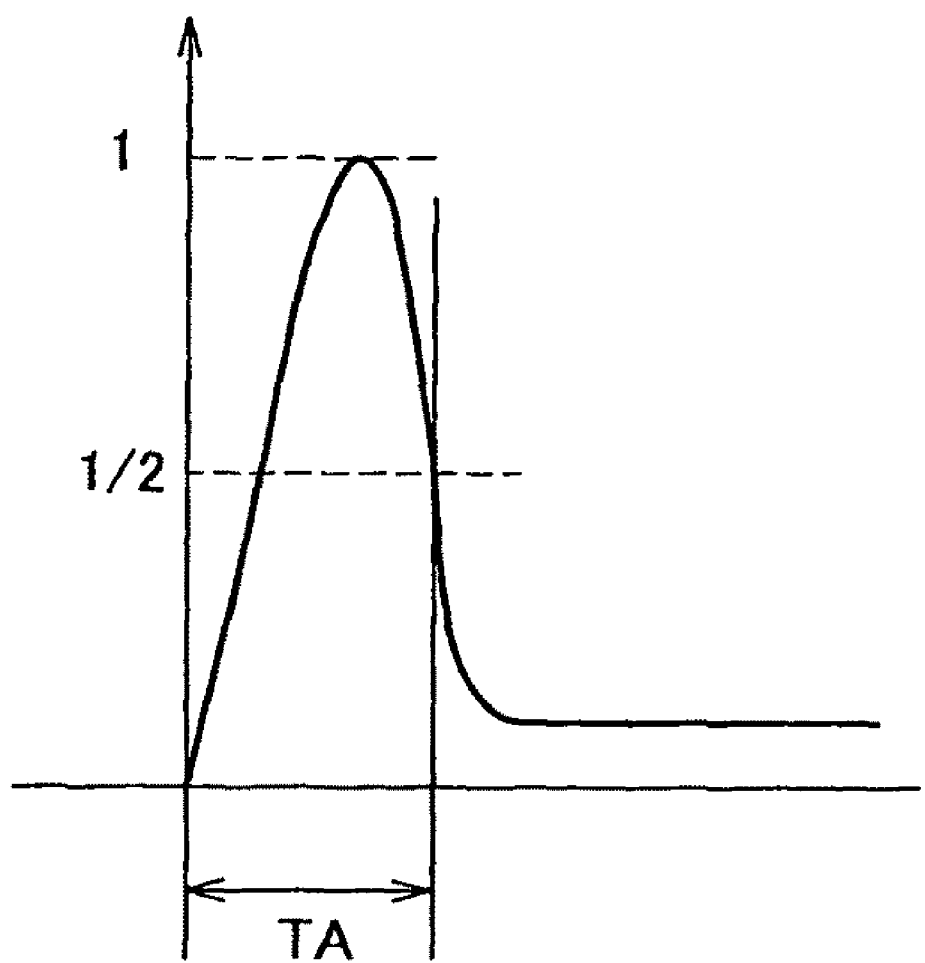
FIG. 4 is a drawing describing the halving time of the inrush current.

FIG. 3 is a drawing showing the relationship between start times of the AHC motor and the VSC motor. In this drawing, T1 is a period of time between the time when the AHC-ECU sends the AHC motor start notification signal (i.e., from the occurrence of the start demand) and the time when the AHC motor starts (for example, 1250 ms). The symbol n05 is the maximum communication lag from the AHC-ECU to the VSC-ECU, including the maximum delay time T2 for the AHC motor start notification signal to reach the VSC-ECU via the communication line 30 (for example, 135 ms). The symbol v34 is a period of time between the time when the VSC-ECU receives the signal notification signal from the AHC-ECU and the time when resource usage of the VSC motor is completed, including the time TA which is the half-life of the inrush current that flows when the VSC motor is started (for example, 80 ms). FIG. 4 is a drawing describing the half-life TA of the inrush current. Upon the start of an electrical load (and particularly in the case of an electrical load such as a motor), an inrush current, which is larger than the steady-state current, flows in accordance with the transient characteristics of the electrical load. As shown in FIG. 4, the value of the current flowing in the electrical load, after reaching a peak current value I, decreases until it reaches the steady-state current. The time TA is a period of time between the time when the electrical load starts and the time when the amount of current reaches one-half of the peak current value I after reaching the peak current value. In this case, T1 in FIG. 3 is set to a time that is longer than T2 and also longer than the sum of T2 and TA. If the processing time and the like in the ECUs are considered, T1 is set to a time that is longer than n05 and also longer than the sum of n05 and v34.

When the settings such as the foregoing are made, if a VSC motor start demand occurs before the VSC-ECU receives the start notification signal from the AHC motor (that is, if a VSC motor start demand occurs during the time period (1)), the VSC-ECU applies the operating rule (A) and starts the VSC motor. That is, if the VSC motor is started in this manner, even if the VSC-ECU receives the start notification signal from the AHC motor after the VSC motor is started, it is possible to allow the half-life TA of the inrush current of the VSC motor to elapse (or to allow the VSC motor resource usage time TR5 to elapse) before starting the AHC motor.

If a VSC motor start demand occurs when the elapsed time after the VSC-ECU receives the start notification signal from the AHC motor is shorter than the value of T1 minus T2 and TA (or the value of T1 minus n05 and v34), that is, when a VSC motor start demand occurs in the time period (2)), the VSC-ECU applies rule (B) and starts the VSC motor. Thus, if the VSC motor is started in this manner, even if the VSC motor is started after the VSC-ECU receives the start notification signal from the AHC motor, it is possible to allow the half-life TA of the inrush current of the VSC motor (or to allow the elapse of the VSC motor resource usage time TR5) to elapse before starting the AHC motor.

If a VSC motor start request occurs when the time elapsed after the VSC-ECU receives the AHC motor start notification signal is longer than the value of T1 minus T2 and TA (or the value of T1 minus n05 and v34), that is, is a VSC motor start demand occurs during the time period (3), the VSC-ECU applies the rule (C) and waits for the completion of the start of the AHC motor before starting the VSC motor. That is, by starting the VSC motor in this manner, it is possible to prevent the AHC motor from starting before the half-life of the inrush current of the VSC motor has elapsed (or before the VSC motor resource usage time TR5 has elapsed).

In the time period (3) in FIG. 3, a27 is the sum of the AHC motor resource usage time TR4, which includes the time for the inrush current that flows when the AHC motor is started, and the output period a21 of the AHC motor. For example, if the AHC motor resource usage time TR4 is 50 ms and the AHC motor output period a21 is 100 ms, a27 corresponds to 150 ms. When the completion of the processing routine for the pump starting relay associated with the AHC motor completes the start of the AHC motor, the AHC-ECU removes the AHC motor start notification signal (or sends a start completion notification signal via the communication line 30 to the VSC-ECU to notify of the completion of the start of the AHC motor). The n05 in the time period (3) in FIG. 3 is the maximum communication delay from the AHC-ECU to the VSC-ECU, which includes the maximum delay time for the removal of the AHC motor start notification signal (or an AHC start completion notification signal) to reach the VSC-ECU via the communication line 30. That is, when the elapsed time from when the AHC motor start notification signal is received is longer than the value of T1 minus T2 and TA (or the value of T1 minus n05 and v34), the VSC-ECU applies the operating rule (C) and starts the VSC motor after the removal of the AHC motor start notification signal (or starts the VSC motor after receiving an AHC start completion notification signal).

That is, if a start demand for the VSC motor occurs after the VSC-ECU receives an AHC motor start notification signal and the time period during which the VSC motor can be started without waiting for the start of the AHC motor is v25, and v25 is, for example, set to 1020 ms, because the maximum waiting time from the occurrence of the start demand for the VSC motor is T1−v25+a27+n05=1250−1020+150+135=515 ms, there is a margin with respect to the maximum waiting time TR2 of the VSC motor (750 ms, restrictive condition (2)).

By controlling the starts of the AHC motor and the VSC motor in this manner, the VSC motor and the AHC motor can be started without mutual interaction, while satisfying the above-described restrictive conditions.

Therefore, even if demands to start the AHC motor and the VSC motor occur substantially simultaneously, by offsetting the timing of the starts of the two as noted above, it is possible to eliminate overlapping of the inrush currents thereof and reduce the decrease in voltage on the power supply line 13.

In FIG. 3, if a demand to start the VSC motor occurs when the elapsed time after the VSC-ECU receives the AHC motor start notification signal is longer than the value of T1 minus T2 and TA (or the value of T1 minus n05 and v34), that is, if a start demand for the VSC motor occurs during the time period (3)), the VSC-ECU may send a VSC motor start notification signal to the AHC-ECU to notify of the start of the VSC motor, in order to have the AHC motor start earlier. In this case, if the AHC-ECU receives the VSC motor start notification signal after sending the AHC motor start notification signal, the AHC-ECU starts the AHC motor without waiting for the time period T1 to elapse. By doing this, because the start of the AHC motor is accelerated even if the operating rule (C) is applied, it is possible to wait for the completion of the start of the AHC motor and to accelerate timing of the start of the VSC motor, and it is possible to shorten the VSC motor delay time. With regard to the foregoing operation to accelerate the start of the other motor with respect to the AI motor, the same effect may be achieved between the VSC motor and the AI motor.

The control of the starting of the AI motor and the VSC motor will now be described. In the relationship between the vehicle stability controller 2 and the secondary air supplying device 3, which has a lower priority ranking than the vehicle stability controller 2, consider the occurrence of a start demand for the AI motor of the secondary air supplying device 3 as being earlier than the start demand for the VSC motor of the vehicle stability controller 2.

Figure 10:
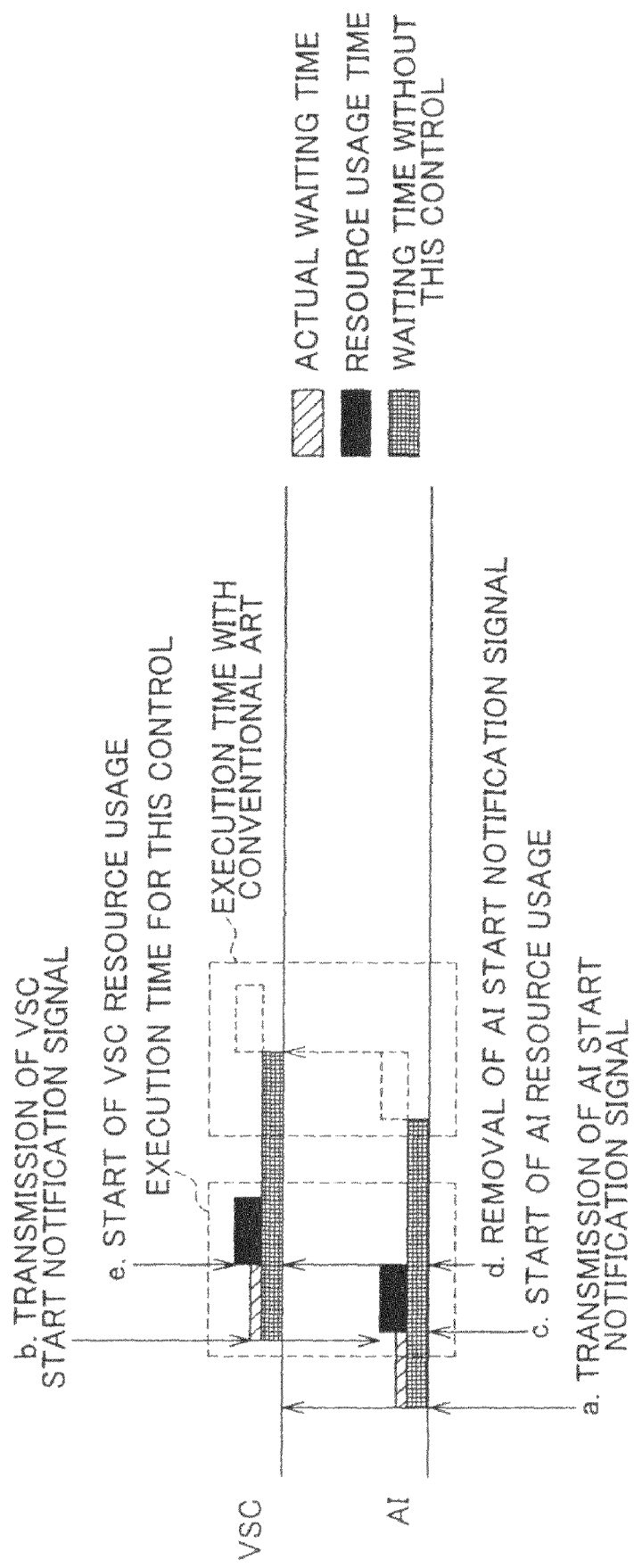
FIG. 10 is a drawing showing the relationship of the start control for the AI motor and the VSC motor.

FIG. 10 shows the relationship of the start control for the AI motor and the VSC motor. In this case, the above-described rule is changed to cause the following operation. When an AI motor start demand occurs, the AI-ECU of the secondary air supplying device 3, in accordance with the operating rule (I), sends a start notification signal (AI motor start notification signal) notifying the VSC-ECU of the start of the AI motor (a.), and waits for the elapse of the time T5 before the start of the AI motor (AI motor start preparation time). If a VSC motor start demand occurs after the VSC-ECU receives the AI motor start notification signal, the VSC-ECU sends a start notification signal (VSC motor start notification signal) notifying the AI-ECU of the start of the VSC motor (b.), and starts waiting for the start of the VSC motor until the VSC-ECU receives the AI start completion notification signal from the AI-ECU (VSC motor start preparation condition).

When the AI-ECU receives the VSC motor start notification signal, the AI-ECU assumes that the VSC motor has not started and, without continuing to wait until the elapse of the time T5 for the start of the AI motor, starts the AI motor (c.) and when the starting of the AI motor is completed, removes the AI motor start notification signal (d.). When the VSC-ECU receives a signal indicating that the AI motor start notification signal from the AI-ECU is removed, the VSC-ECU starts the VSC motor.

By causing operation in this manner, contention for resource usage between the AI motor and the VSC motor is prevented, and the waiting time from the occurrence of a start demand until the start can be shortened.

The details of the foregoing control will now be described. As shown in the restrictive condition (6), because the resource usage time TR6 of the AI motor (300 ms) is the longest of all the motors, the restriction on the starting of the VSC motor, which has the shortest maximum waiting time, is the greatest. Therefore, the "control of the starting of the AI motor and the VSC motor described above cannot be thought of as being equivalent to the "control of the AHC motor and the VSC motor."

Figure 11:
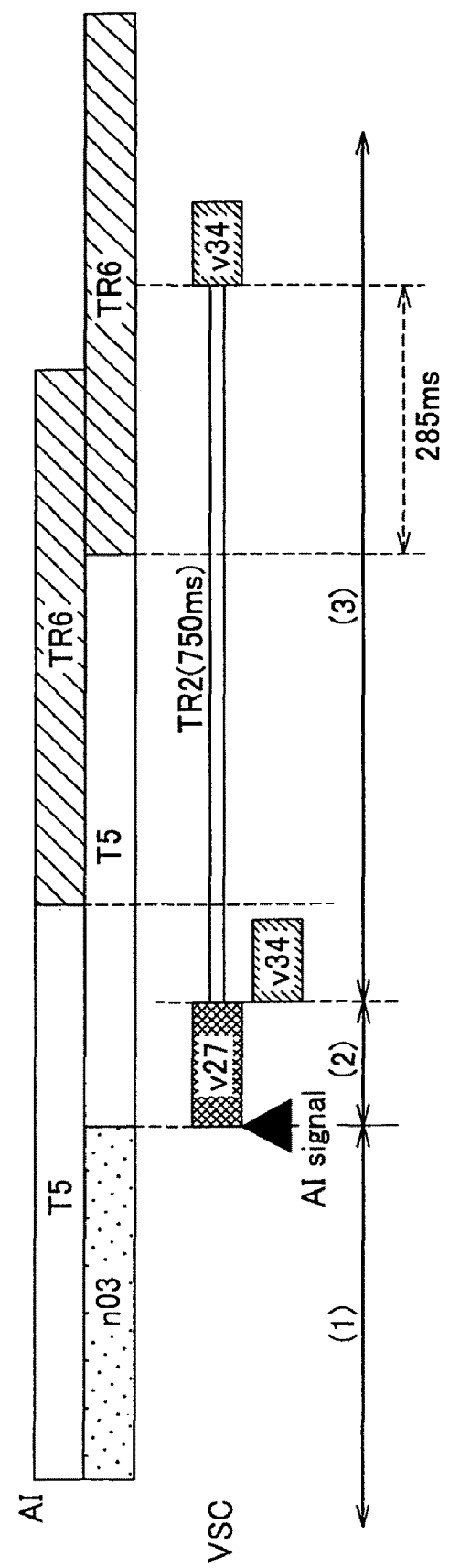
FIG. 11 is a drawing showing the relationship between the start timing of the AI motor and the VSC motor.

FIG. 1 shows the relationship between the start timing of the AI motor and the VSC motor. FIG. 11 shows the condition in which the VSC-ECU receives the AI motor start notification signal. Considering the communication time from the AI-ECU to the VSC-ECU, what is assumed by this condition is all the conditions between the two times of [i.] the time at which the AI-ECU sends the start notification signal immediately before receiving the AI motor start notification signal, and [ii.] the time at which the AI-ECU sends the start notification signal before the receiving of the AI motor start notification signal at n03. In this case, n03 is the maximum communication lag between the AI-ECU to the VSC-ECU (for example, 365 ms).

In the same manner as the case described above, in which the VSC-ECU receives the AHC motor start notification signal, if a VSC motor start demand occurs before the VSC-ECU receives the AI motor start notification signal (the time period (1) in FIG. 1) or in the time from when the VSC-ECU receives the AI motor start notification signal until the time v27 elapses (time period (2) in FIG. 11), the VSC-ECU applies rules (A) and (B) and starts the VSC motor. Accordingly, by starting the VSC motor in this manner, it is possible to allow the half-life TA of the inrush current of the VSC motor (or the resource usage time of TR5 of the VSC motor) to elapse before starting the AI motor.

According to the operating rule (C), if a VSC motor start demand occurs after the time v27 has elapsed since the VSC-ECU receives the AI motor start notification signal (time period (3) in FIG. 11), the VSC-ECU waits for the completion of the start of the AI motor and then starts the VSC motor.

However, as indicated by [i.] above, there are cases in which the AI-ECU sends the start notification signal immediately before the VSC-ECU receives the AI motor start notification signal. Therefore, when a start demand for the VSC motor occurs immediately after receiving the AI motor start notification signal, the start of the VSC motor occurs is delayed for a much longer time after the maximum delay time TR2 of the VSC motor (restrictive condition (2)).

That is, if a VSC start demand occurs immediately after the VSC-ECU receives the AI motor start notification signal, even if the maximum delay time TR2 of the VSC motor has elapsed, as shown in FIG. 11, at a time of (TR2+v27−T5)=750+135−600=285 ms) after the start of the AI motor, the VSC motor must be started, which results in the restrictive condition (6) not being satisfied.

Given the above, new rules are added to the VSC motor and AI motor operating rules.

The second operating rules for the VSC motor are: (A) the AHC-ECU sends a AHC motor start notification signal when a AHC motor start demand occurs, the AI-ECU sends a AI motor start notification signal when a AI motor start demand occurs, and the VSC-ECU starts the VSC motor without notification, if the VSC-ECU does not receive the AHC motor start notification signal and the AI motor start notification signal; (B) the VSC-ECU starts the VSC motor if the VSC-ECU receives the AHC motor start notification signal or the AI motor start notification signal when the starting of the VSC motor can be completed before the start of the AHC motor or the AI motor; (C') when the VSC-ECU receives an AHC motor start notification signal and the starting of the VSC motor cannot be completed before the start of the AHC motor, the VSC-ECU waits until the starting of the AHC motor is completed before starting the VSC motor; and (D) when the VSC-ECU receives the AI motor start notification signal and the starting of the VSC motor cannot be completed before the start of the AI motor, the VSC-ECU accelerates the starting of the AI motor and sends a start notification signal (VSC motor start notification signal) that notifies of the start of the VSC motor. The second operating rules for the AI motor are: (I) when the AI motor start demand occurs, the AI-ECU sends an AI motor start notification signal to notify the VSC-ECU and the AHC-ECU of the start of the AI motor, waits for the time T5 to elapse before starting the AI motor; and (II) if the AI-ECU receives the VSC motor start notification signal from the VSC-ECU after the AI-ECU sends the AI motor start notification signal, the AI-ECU starts the AI motor without waiting for the time T5 to elapse.

Figure 12:
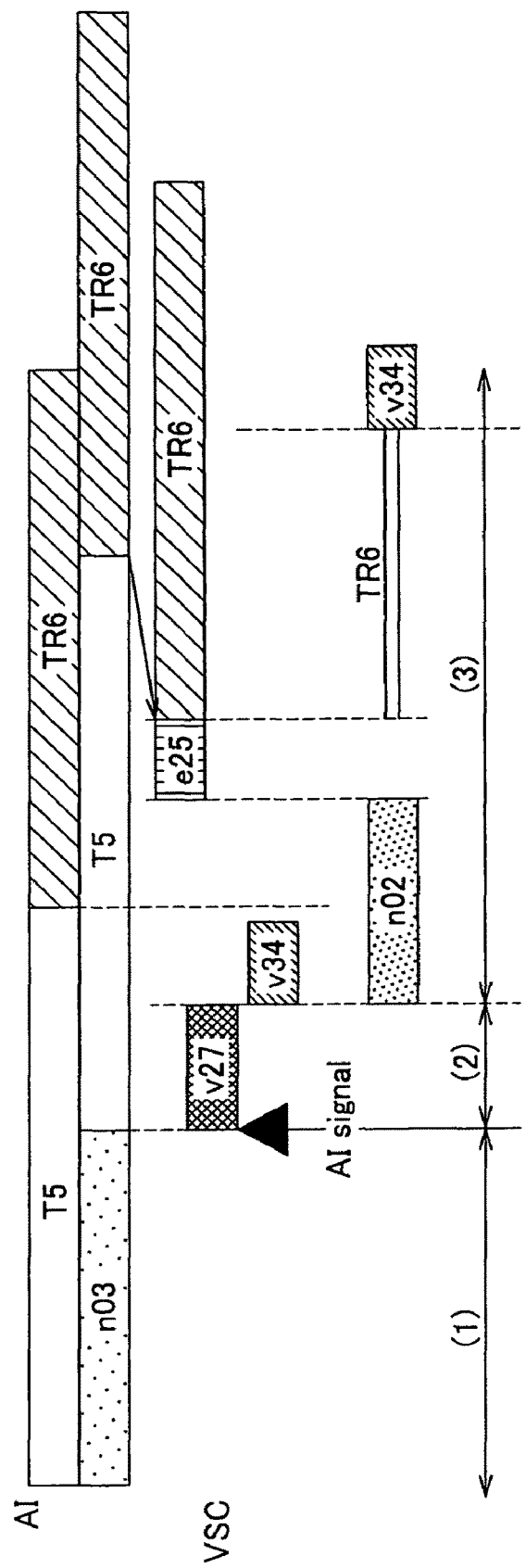
FIG. 12 is a drawing showing that the VSC motor waiting time can be shortened by accelerating the start of the AI motor.

By performing operation according to the foregoing rules, as shown in FIG. 12, by accelerating the start of the AI motor, it is possible to shorten the delay in starting the VSC motor by n02+e25+TR6=210+80+300=590 ms. In this calculation, n02 is the maximum communication lag from the VSC-ECU to the AI-ECU, e25 is the sum of the processing period and the output period of the AI-ECU, and TR6 is the resource usage time of the AI motor.

With regard to the start control of the AI motor, the VSC motor, and the AHC motor, consider the case in which the VSC-ECU receives the AI motor start notification signal and the AHC motor start notification signal at times in proximity to each other.

Even if the VSC-ECU receives both AI and AHC motor start notification signals when a demand to start the VSC motor occurs, if the VSC-ECU had received the AHC motor start notification signal after receiving the AI motor start notification signal, the start of the AHC motor should always be stopped and the start demand removed in accordance with the AHC motor operating rule (β). Therefore, this can be reduced to a conflict between the AI-ECU and the VSC-ECU.

If the VSC-ECU receives the AHC motor start notification signal within the time v25 after the occurrence of a VSC motor start demand, during which the VSC motor can start before the AHC motor starts, and the CSC-ECU also receives the AI motor start notification signal within the time v27 after a VSC motor start demand occurs, during which the VSC motor can start before the AI motor starts, the VSC motor is started immediately (refer to FIG. 12). Accordingly, it is possible to allow the resource usage time of the VSC motor to elapse before starting the other motors.

If these conditions do not apply, the VSC motor is delayed until the limit of time that is the maximum delay time TR2 has elapsed, although there are cases in which conditions are not satisfied even then. Such conditions are described below.

Figure 13:
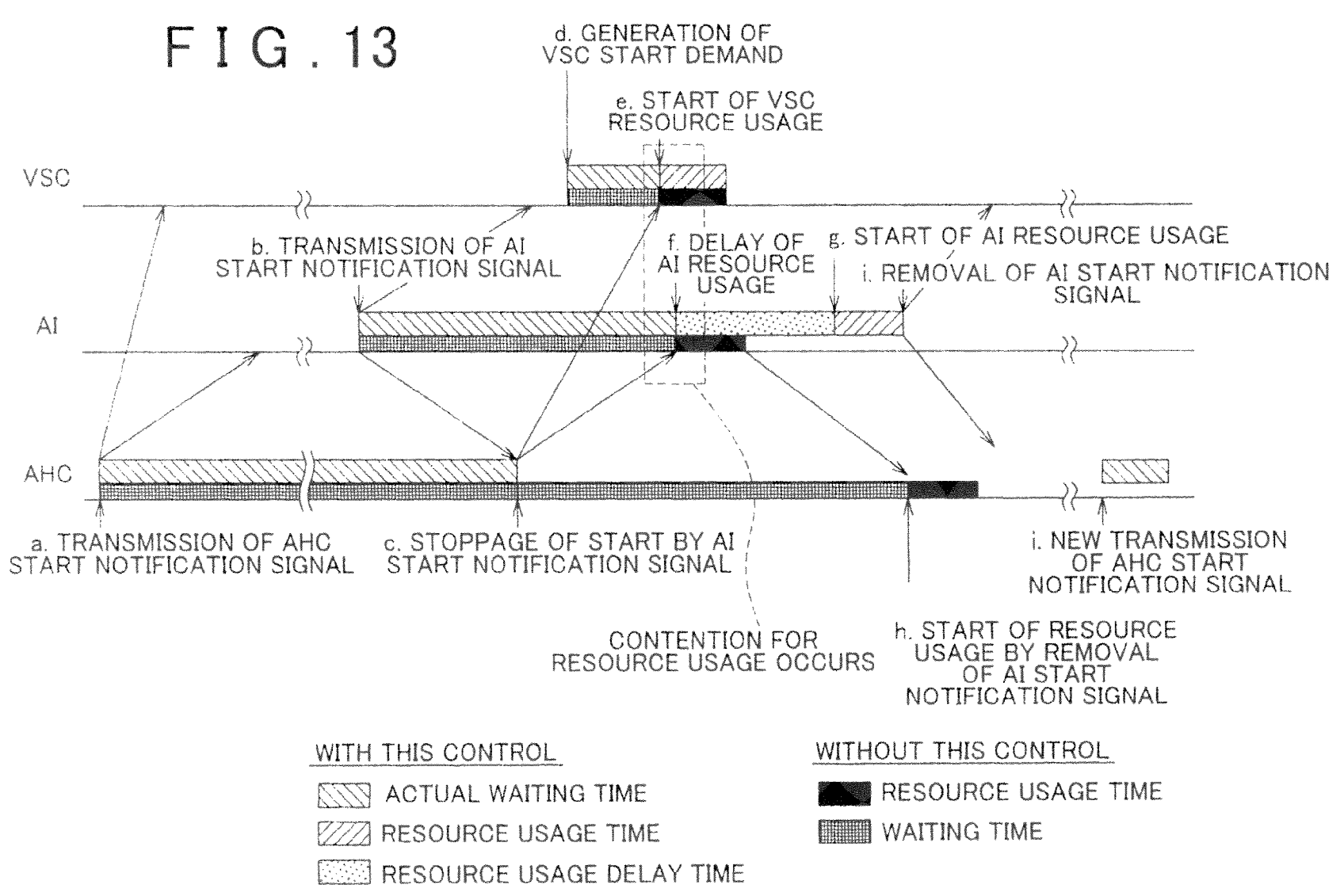

For example, as shown in FIG. 13, a removal signal indicating that the AHC motor start notification signal is removed is transmitted to the VSC-ECU and the AI-ECU. If the VSC-ECU and the AI-ECU start the respective motors when receiving the removal signal indicating that the AHC motor start notification signal is removed, there could be contention for resource usage as shown in FIG. 13. Also, even if the VSC-ECU waits the maximum VSC motor delay time TR2 before starting the VSC motor, the VSC motor starts at TR2−T5=750−600=150 ms after the start of the AI motor, resulting in the restrictive condition (6) not being satisfied.

Given the above, when, as shown in FIG. 13, the AI motor delay has continued until the AI-ECU receives the removal of the AHC motor start notification signal, the AI-ECU, rather than starting the AI motor immediately after receiving the removal of the AHC motor start notification signal, starts the AI motor after a prescribed time has elapsed since the AI-ECU receives the removal of the AHC motor start notification signal. That is, when the AI-ECU receives the removal of the AHC motor start notification signal, the AI-ECU treats this as if the removal of the AHC motor start notification signal has been received, similar to the VSC-ECU and, if the AI motor is then started after waiting for the completion of the start of the VSC motor by the VSC-ECU, which has received the removal of the AHC motor start notification signal, it is possible to avoid contention for resource usage.

Considering the above point, therefore, the third operating rules for the AI motor are: (I) if a demand to start the AI motor occurs, the AI-ECU sends an AI motor start notification signal to notify the VSC-ECU and the AHC-ECU of the start of the AI motor and waits for the time T5 before starting the AI motor; (II') if the AI-ECU does not receive the AHC motor start notification signal and it the AI-ECU also receives the VSC motor start notification signal from the VSC-ECU after the AI-ECU sends the AI motor start notification signal, the AI-ECU starts the AI motor without waiting the time T5; and (III) if the AI-ECU receives the AHC motor start notification signal, and also if an AI motor start demand occurs and the AI-ECU receives a removal signal indicating that the AHC motor start notification signal is subsequently removed, the AI-ECU starts the AI motor the time e03 after the point at which the removal of the AHC motor start notification signal is received.

The time e03 within the third operating rule for the AI motor is a time corresponding to the time from the VSC output to the completion of the resource usage (for example, 65 ms).

Further, with regard to the start control of the AI motor, the VSC motor, and the AHC motor, in the case of the VSC and the AI motor, as described above, the VSC-ECU starts the VSC motor if the time is within v25 after the VSC-ECU receives the AHC motor start notification signal (refer to the VSC motor operating rule (B) and FIG. 3), and if the time exceeds the time v25, the VSC motor is started after receiving the removal of the AHC motor start notification signal (refer to the VSC motor operating rule (C) and FIG. 3). When this is done, it is thought that a demand to start the AI motor has occurred.

In this case, in accordance with the operating rule (C) or (C'), in order that the starting of the VSC motor after receiving the removal of the AHC motor start notification signal does not violate the restrictive condition (6), that the VSC motor cannot be started within the time TR6 after the beginning of the start of the AI motor, a new rule is added that causes a delay for starting the AI motor, which has a lower priority ranking than the VSC motor.

The VSC motor third operating rules are: (A) the AHC-ECU sends a start notification signal to the VSC-ECU when a demand to start the AHC motor, the AI-ECU sends a start a start notification signal to the VSC-ECU when a demand to start the VSC motor, and the VSC-ECU starts the VSC motor without notification, if the VSC-ECU does not receive the start notification signal from the AHC-ECU and the start notification signal from the AI motor; (B) the VSC-ECU starts the VSC motor if the VSC-ECU motor receives the start notification signal from the AHC motor or the AI motor and the starting of the VSC motor can be completed before the start of the AHC motor or the AI motor; (C") if the VSC-ECU receives the AHC motor start notification signal and it is determined that the starting of the VSC motor can not be completed before the start of the AHC motor, the VSC-ECU waits until the completion of the starting of the AHC motor before starting the VSC motor, and if the VSC-ECU receives an AI motor start notification signal while waiting for the completion of the start of the AHC motor, the VSC-ECU sends the VSC motor start notification signal; and (D) if the VSC-ECU receives the AI motor start notification signal and it is determined that the starting of the VSC motor can not be completed before the AI motor is started, the VSC-ECU sends a VSC motor start notification signal that notifies of the start of the VSC motor to accelerate the starting of the AI motor. The fourth operating rules for the AI motor are: (1) when an AI motor start demand occurs, the AI-ECU sends a start notification signal (AI motor start notification signal) to notify the VSC-ECU and the AHC-ECU of the start of the AI motor and waits for the time T5 to elapse before starting the AI motor; (II') if, when the AI-ECU does not receive the AHC motor start notification signal, the AI-ECU receives the VSC motor start notification signal from the VSC-ECU after sending a AI motor start notification signal, the AI-ECU starts the AI motor without waiting for the time T5 to elapse; and (III') if, when the AI-ECU receives the AHC motor start notification signal, the AI-ECU receives a removal of the AHC motor start notification signal after a start demand for the AI motor occurs, the AI-ECU starts the AI motor at a time e03 after the AI-ECU receives the removal of the AHC motor start notification signal. Also, if the AI-ECU receives the VSC motor start notification signal during a period of time from when a start demand for the AI motor occurs to when the AI-ECU receives the removal of the AHC motor start notification signal, the AI-ECU starts the AI motor when the AI-ECU receives the removal signal of the VSC motor start notification signal after the start of the VSC motor is completed. By operating in accordance with this type of operating rule, even if a demand to start the AI motor occurs, which has a lower priority ranking than the VSC motor, it is possible to wait the maximum delay time TR3 of the AI motor before starting the AI motor, while satisfying the restrictive condition (6).

Further with regard to the start control of the AI motor, the VSC motor, and the AHC motor, the removal signal indicating that the AHC motor start notification signal transmitted by the AHC-ECU is removed, because communication delays depend on a communication line between electrical loads as shown in FIG. 8, is first received by the VSC-ECU, which is connected to the same communication line 30 as the AHC-ECU, and then is received by the AI-ECU, which is connected via the gateway 15 to the communication line 31 through a different communication line from that of the AHC-ECU. Therefore, a situation occurs in which, as seen from the VSC-ECU at this same time although the VSC-ECU does not have the AHC motor start notification signal (the VSC-ECU has received the removal signal of the AHC motor start notification signal after the AHC motor start notification signal was received and, as seen from the AI-ECU, the AI-ECU has the AHC motor notification signal (the AI-ECU has not received the removal of the AHC motor start notification signal after the AHC motor start notification signal was received).

In this case, the AI-ECU applies the rule (III') and starts the AI motor at a time e03 after the AI-ECU receives the removal signal of the AHC motor start notification signal. If, however, the time from when the demand to start the AI motor occurs until the removal of the AHC motor start notification signal is short, there is a chance that the AI motor start notification signal, which was sent from the AI-ECU when the demand to start the AI motor occurs, may not reach the VSC-ECU (operating rule (I)). As a result, because a situation occurs in which no start notification signal reaches the VSC-ECU, in accordance with the operating rule (A), if the VSC motor is started immediately when the demand to start the VSC motor occurs, the resource usage by the AI motor and the VSC motor may overlap.

Given the above, even when there is no demand for the start by another ECU, in order to send the VCS motor start notification signal within a prescribed period of time after the VSC-ECU receives the removal signal of the AHC motor start notification signal, a rule (Z) is added to the VSC motor operating rules. As a result, the fourth VSC motor operating rules are: (Z) the VSC-ECU, only when a demand to start the VSC motor occurs within the time v23 after the VSC-ECU receives the removal signal of the AHC motor start notification signal, sends the VSC motor start notification signal and starts the VSC motor after a time v30 has elapsed since the demand to start the VSC motor occurs (the time of sending the VSC motor start notification signal); (A) the AHC-ECU sends a start notification signal to the VSC-ECU when a demand to start the AHC motor, the AI-ECU sends a start a start notification signal to the VSC-ECU when a demand to start the VSC motor, and the VSC-ECU starts the VSC motor without notification, if the VSC-ECU does not receive the start notification signal from the AHC-ECU and the start notification signal from the AI motor; (B) the VSC-ECU starts the VSC motor if the VSC-ECU motor receives the start notification signal from the AHC motor or the AI motor and the starting of the VSC motor can be completed before the start of the AHC motor or the AI motor; (C") if, after the VSC-ECU receives the AHC motor start notification signal, it is not possible to complete the starting of the VSC motor before the start of the AHC motor, the VSC-ECU waits until the completion of the starting of the AHC motor before starting the VSC motor, and if the VSC-ECU receives an AI motor start notification signal while waiting for the completion of the start of the AHC motor, the VSC-ECU sends the VSC motor start notification signal; and (D) if, after the VSC-ECU receives the AI motor start notification signal, it is not possible to complete the start the VSC motor before the AI motor is started, the VSC-ECU sends a VSC motor start notification signal that notifies of the start of the VSC motor in order to accelerate the starting of the AI motor.

With regard to (Z) of the fourth VSC motor operating rules, v32 is the delay time for the demand to start the VSC motor after the VSC-ECU receives the removal signal of the AHC motor start notification signal, and v30 is a delay time from when the demand to start the VSC motor occurs (time of sending the VSC motor start notification signal) after the VSC-ECU receives the removal signal of the AHC motor start notification signal until the start of the VSC motor.

By causing operation in this manner, when the AI-ECU receives the VSC motor start notification signal under the operating rule (Z), the starting of the AI motor is executed earlier in accordance with the AI-ECU operating rule (II) (or II'). Therefore, it is possible not only to start earlier, but also to avoid contention for resource usage by the AI motor and the VSC motor.

That is, if the maximum communication lag from the VSC-ECU to the AI-ECU is n02 and the processing period of the AI-ECU is e20, using the values given in FIGS. 5, 6, and 8, the calculation is possible of v30−(n02+e20)=550−(210+40)=300 ms, thereby satisfying the restrictive condition (6) of the VSC motor not starting within the time TR6 (300 ms) after the AI motor is started.

The present invention is not restricted to the embodiment described above, and may be variously modified or subjected to replacements, within the scope of the present invention.

For example, in FIG. 3 if T1 is set to a time that is twice T2, even if the VSC-ECU fails to receive the AHC motor start notification signal transmitted by the AHC-ECU, it is possible to perform starting while satisfying the foregoing restrictive conditions based on the AHC motor start notification signal that is received on the second or subsequent time, without interaction between the operation of the VSC motor and the AHC motor.

Although the foregoing embodiment is described for the case in which the electrical loads are an active height control suspension 1 and a vehicle stability controller 2, the electrical load, may be any electrical load that allows a delay from the occurrence of a start demand. An electrical load that allows a delay from the occurrence of a start demand may be, for example, an electrical load that is started by the operation of a switch or a command from a computer, wherein the delay in starting is not noticed by a user, or an electrical load for which a decrease in performance resulting from a delay in starting is acceptable.

The invention claimed is:

1. An electrical load controller for controlling a start of a first electrical load and a second electrical load comprising:
a start demanding unit that generates a demand to start at least the first electrical load of the first and the second electrical loads, wherein
a first prescribed time period is a duration of time over which an inrush current, generated when the first electrical load is started, decreases to a prescribed value;
a second prescribed time period is a duration of time between the time when a second electrical load notification signal, which indicates that the second electrical load will start, is sent to the first electrical load and the time when the second electrical load starts;
a third prescribed time period is a duration of time required to transmit the second electrical load notification signal from the second electrical load to the first electrical load, wherein
the second prescribed time period is longer than the third prescribed time period,
the first prescribed time period is shorter than the second prescribed time period minus the third prescribed time period, and
the first electrical load starts immediately if the first electrical load has not received the second electrical load notification signal when the start demanding unit generates the demand to start the first electrical load.

2. The electrical load controller according to claim 1, wherein the first electrical load is started after the second electrical load starts if, when the start demanding unit generates the demand to start the first electrical load, an elapsed time after the first electrical load receives the second electrical load notification signal is longer than the second prescribed time period minus the first prescribed time period and the third prescribed time period.

3. The electrical load controller according to claim 2, wherein a fourth prescribed time period is a duration of time over which an inrush current, generated when the second electrical load is started, decreases to a prescribed value, and
the first electrical load is started when the fourth prescribed time has elapsed after the second electrical load is started if, when the start demanding unit generates the demand to start the first electrical load, the elapsed time after the first electrical load receives the second electrical load notification signal is longer than the second prescribed time period minus the first prescribed time period and the third prescribed time period.

4. The electrical load controller according to claim 2, wherein the first electrical load is started after receiving a signal indicating that the start of the second electrical load is completed if, when the start demanding unit generates the demand to start the first electrical load, the elapsed time after the first electrical load receives the second electrical load notification signal is longer than the second prescribed time period minus the first prescribed time period and the third prescribed time period.

5. The electrical load controller according to claim 2, wherein the first electrical load transmits a first electrical load notification signal to the second electrical load when the start demanding unit demands the start of the first electrical load, and the second electrical load starts without waiting for the second prescribed time period to elapse when the second electrical load receives the first electrical load notification signal if, when the start demanding unit demands the start of the first electrical load, the elapsed time after the first electrical load receives the second electrical load notification signal is longer than the second prescribed time period minus the first prescribed time period and the third prescribed time period.

6. The electrical load controller according to claim 1, wherein the first electrical load is an vehicle stability control motor, and the second electrical load is an adjustable-height-suspension motor.

7. The electrical load controller according to claim 1, wherein the second prescribed time period is equal to at least twice a transmission period of the second electrical load notification signal.

8. The electrical load controller according to claim 1, further having a third electrical load,
wherein
the second electrical load also transmits the second electrical load notification signal to the third electrical load before the second electrical load starts,
the third electrical load transmits a third electrical load notification signal, which indicates that the third electrical load will start, to the first and second electrical loads before the third electrical load starts,
the second electrical load determines whether the second electrical load starts in accordance with whether the second electrical load has received at least one of the first and third electrical loads, a timing at which the second electrical load will start, and at least one of a timing at which the first electrical load starts and a timing at which the third electrical load starts, and
the third electrical load determines whether the third electrical load starts in accordance with whether the third electrical load has received at least one of the first and second electrical loads, a timing at which the third electrical load will start, and at least one of the timing at which the first electrical load starts and the timing at which the second electrical load starts.

9. An electrical load controller for controlling a start of a first electrical load and a second electrical load, wherein
a priority ranking of the second electrical load is lower than that of the first electrical load,
the first electrical load sends a first electrical load notification signal to the second electrical load and starts when a prescribed first electrical load delay time has elapsed after the first electrical load notification signal is sent to the second electrical load,
the second electrical load sends a second electrical load notification signal to the first electrical load and starts when a prescribed second electrical load delay time has elapsed after the second electrical load notification signal is sent to the first electrical load; and
the second electrical load starts without waiting for the elapse of the second electrical load delay time, if the second electrical load receives the first electrical load notification signal after the second electrical load notification signal is sent.

10. An electrical load controller for controlling a start of a first electrical load, a second electrical load and a third electrical load, wherein
a priority ranking of the second electrical load is lower than that of the first electrical load and the priority ranking of the third electrical load is lower than that of the second electrical load;
the second electrical load sends a second electrical load notification signal to the first and third electrical loads and starts when a first prescribed second electrical load delay time has elapsed after the second electrical load notification signal is sent to the first and third electrical loads;
the third electrical load sends a third electrical load notification signal to the first and second electrical loads and starts when a prescribed third electrical load delay time has elapsed after the third electrical load notification signal is sent to the first and second electrical loads;
the starting of the third electrical load is stopped if the third electrical load receives the second electrical load notification signal after the third electrical load notification signal is sent;
the third electrical load sends a third electrical load completion signal to the first and second electrical loads when the starting of the third electrical load is stopped; and
the second electrical load starts when a second prescribed second electrical load delay time has elapsed after the third electrical load completion signal is received.

11. An electrical load controller for controlling a start of a first electrical load, a second electrical load and a third electrical load, wherein
a priority ranking of the second electrical load is lower than that of the first electrical load and a priority ranking of the third electrical load is lower than that of the second electrical load;
the third electrical load sends a third electrical load notification signal to the first and second electrical loads when the demand to start the third electrical load is generated and starts when a prescribed first delay time has elapsed after the third electrical load notification signal is sent to the first and second electrical loads, and the third electrical load stops sending the third electrical load notification signal and is stopped from starting if the third electrical load receives a first electrical load notification signal from the first electrical load or receives a second electrical load notification signal from the second electrical load;
the second electrical load sends a second electrical load notification signal to the first and third electrical loads when a demand to start the second electrical load is generated, and starts when a prescribed second delay time has elapsed after the second electrical load notification signal is sent to the first and third electrical loads, and the second electrical load starts, without waiting for the elapse of the prescribed second delay time, if the second electrical load receives the first electrical load notification signal after sending the second electrical load notification signal if the second electrical load does not receive the third electrical load notification; and the first electrical load starts when a demand to start the first electrical load is generated if the first electrical load does not receive the second and the third electrical load notification signals, and if the demand to start the first electrical load is generated within a prescribed third delay time after the first electrical load stops receiving the third electrical load notification, the first electrical load sends the first electrical load notification signal to the second and third electrical loads and starts when a prescribed fourth delay time has elapsed after the first electrical load notification signal is sent to the second and third electrical loads.

12. An electrical load control method of controlling at least a first electrical load and a second electrical load, wherein a first prescribed time period is a duration of time over which an inrush current, generated when the first electrical load is started, decreases to a prescribed value, the method comprising:

generating a demand to start the second electrical load;

sending a second electrical load notification signal to the first electrical load when the demand to start the second electrical load is generated;

starting the second electrical load when a second prescribed time period has elapsed after the second electrical load notification signal is sent to the first electrical load;

generating a demand to start the first electrical load; and starting the first electrical load immediately after the demand to start the first electrical load is generated if the first electrical load has not received the second electrical load notification signal when the demand to start the first electrical load is generated, wherein a third prescribed time period is required to transmit the second electrical load notification signal from the second electrical load to the first electrical load, the second prescribed time period is longer than the third prescribed time period, and the first prescribed time period is shorter than the second prescribed time period minus the third prescribed time period.

13. The method according to claim 12, wherein the method also controls a third electrical load, the method further comprising:

transmitting the second electrical load notification signal to the third electrical load before the second electrical load starts, transmitting a third electrical load notification signal, which indicates that the third electrical load will start, to the first and second electrical loads before the third electrical load starts, determining whether the second electrical load starts in accordance with whether the second electrical load has received at least one of the first and third electrical loads, a timing at which the second electrical load will start, and at least one of a timing at which the first electrical load starts and a timing at which the third electrical load starts, and determining whether the third electrical load starts in accordance with whether the third electrical load has received at least one of the first and second electrical loads, a timing at which the third electrical load will start, and at least one of the timing at which the first electrical load starts and the timing at which the second electrical load starts.

14. An electrical load control method of controlling at least a first electrical load and a second electrical load, wherein the second electrical load has a lower priority ranking than the first electrical load, the method comprising:

generating a demand to start the first electrical load;

sending a first electrical load notification signal to the second electrical load when the demand to start the first electrical load is generated;

starting the first electrical load when a prescribed first electrical load delay time has elapsed after the first electrical load notification signal is sent to the second electrical load;

generating a demand to start the second electrical load;

sending a second electrical load notification signal to the first electrical load when the demand to start the second electrical load is generated;

starting the second electrical load when a prescribed second electrical load delay time has elapsed after the second electrical load notification is sent to the first electrical load; and starting the second electrical load without waiting for the elapse of the prescribed second electrical load delay time if the second electrical load receives the first electrical load notification signal after the second electrical load notification signal is sent.

15. An electrical load control method of controlling at least a first electrical load, a second electrical load and a third electrical load, wherein the second electrical load has a lower priority ranking than the first electrical load, and the third electrical load has a lower priority ranking than the second electrical load; the method comprising:

generating a demand to start the second electrical load;

sending a second electrical load notification signal to the first and third electrical loads when the demand to start the second electrical load is generated;

starting the second electrical load when a first prescribed second electrical load delay time has elapsed after the second electrical load notification signal is sent to the first and third electrical loads;

generating a demand to start of the third electrical load;

sending a third electrical load notification signal to the first and second electrical loads when the demand to start the third electrical load is generated;

starting the third electrical load when a prescribed third electrical load delay time has elapsed after the third electrical, load notification signal is sent to the first and second electrical loads;

stopping the third electrical load from starting if the third electrical load receives the second electrical load notification signal after the third electrical load notification signal is sent;

sending a third electrical load completion signal from the third electrical load to the first and second electrical loads when the starting of the third electrical load is stopped; and starting the second electrical load when a second prescribed second electrical load delay time has elapsed after the third electrical load completion signal is received.

16. An electrical load control method of controlling at least a first electrical load, a second electrical load and a third electrical load, wherein the second electrical load has a lower priority ranking than the first electrical load, and the third electrical load has a lower priority ranking than the second electrical load; the method comprising:

generating a demand to start the third electrical load;

sending a third electrical load notification signal to the first and second electrical loads when the demand to start the third electrical load is generated;

starting the third electrical load when a prescribed first delay time has elapsed after the third electrical load notification signal is sent to the first and second electrical loads;

stopping the transmission of the third electrical load notification signal and also stopping the third electrical load from starting when the third electrical load receives a first electrical load notification signal from the first electrical load or a second electrical load notification signal from the second electrical load;

sending a second electrical load notification signal to the first and third electrical loads when the demand to start the second electrical load is generated;

starting the second electrical load when a second delay time has elapsed after the second electrical load notification signal is sent to the first and third electrical loads;

starting the second electrical load without waiting for the elapse of the second delay time if the second electrical load receives the first electrical load notification signal after sending the second electrical load signal when the second electrical load stops receiving the third electrical load notification signal;

starting the first electrical load when a demand to start the first electrical load is generated when the first electrical load does not receive the second and third electrical load notification signals;

sending the first electrical load notification signal to the second and third electrical loads if a demand to start the first electrical load is generated within a prescribed third delay time after the first electrical load stops receiving the third electrical load notification signal; and starting the first electrical load when a prescribed fourth delay time has elapsed after the first electrical load notification signal is sent to the second and third electrical loads.

* * * * *